US012644290B2

(12) United States Patent
Boucké

(10) Patent No.: US 12,644,290 B2
(45) Date of Patent: Jun. 2, 2026

(54) DECORATIVE PANEL, AND DECORATIVE PANEL COVERING

(71) Applicant: I4F Licensing NV, Turnhout (BE)

(72) Inventor: Eddy Alberic Boucké, Turnhout (BE)

(73) Assignee: i4F Licensing NV, Turnhout (BE)

( * ) Notice: Subject to any disclaimer, the term of this patent is extended or adjusted under 35 U.S.C. 154(b) by 247 days.

(21) Appl. No.: 18/276,950

(22) PCT Filed: Feb. 14, 2022

(86) PCT No.: PCT/EP2022/053501

§ 371 (c)(1),
(2) Date: Aug. 11, 2023

(87) PCT Pub. No.: WO2022/171859

PCT Pub. Date: Aug. 18, 2022

(65) Prior Publication Data

US 2024/0117640 A1 Apr. 11, 2024

(30) Foreign Application Priority Data

Feb. 12, 2021 (NL) ..................................... 2027548

(51) Int. Cl.
| | |
|---|---|
| *E04F 13/08* | (2006.01) |
| *B29C 59/04* | (2006.01) |
| *B29L 31/00* | (2006.01) |
| *E04F 15/02* | (2006.01) |
| *E04F 15/10* | (2006.01) |

(52) U.S. Cl.
CPC ...... *E04F 13/0871* (2013.01); *E04F 13/0866* (2013.01); *E04F 13/0894* (2013.01); *E04F 15/02038* (2013.01); *E04F 15/107* (2013.01);

*B29C 59/046* (2013.01); *B29L 2031/732* (2013.01); *E04F 2201/0146* (2013.01); *E04F 2201/023* (2013.01); *E04F 2201/043* (2013.01)

(58) Field of Classification Search
CPC .............. E04F 13/0873; E04F 13/0894; E04F 15/02038; E04F 2201/6138
See application file for complete search history.

(56) References Cited

U.S. PATENT DOCUMENTS

| | | | | |
|---|---|---|---|---|
| 6,006,486 | A | 12/1999 | Moriau et al. | |
| 10,895,079 | B2 * | 1/2021 | Li | ........................ E04F 15/105 |
| 11,414,874 | B2 * | 8/2022 | Li | ........................ E04F 13/0894 |
| 11,421,424 | B2 * | 8/2022 | Li | .......................... B44C 3/025 |
| 11,643,822 | B2 * | 5/2023 | Li | ....................... E04F 13/0871 |
| | | | | 52/314 |
| 11,821,216 | B2 * | 11/2023 | Li | ....................... E04F 13/0866 |

(Continued)

FOREIGN PATENT DOCUMENTS

| | | |
|---|---|---|
| CA | 2332142 A1 | 7/2001 |
| CN | 111806132 A | 10/2020 |

(Continued)

*Primary Examiner* — Gisele D Ford
(74) *Attorney, Agent, or Firm* — The Webb Law Firm

(57) ABSTRACT

The invention relates to a decorative panel, in particular a floor panel, ceiling panel or wall panel. The invention also relates to a decorative panel covering, such as a decorative floor covering, decorative ceiling covering or decorative wall covering, including a plurality of panels according to the invention, wherein the panels are preferably interconnected.

21 Claims, 5 Drawing Sheets

(56)  References Cited

U.S. PATENT DOCUMENTS

| | | | |
|---|---|---|---|
| 11,861,243 B1 * | 1/2024 | Li | ........................ G06F 3/1254 |
| 2009/0252925 A1 | 10/2009 | Provoost et al. | |
| 2011/0268937 A1 | 11/2011 | Schacht et al. | |
| 2018/0298621 A1 | 10/2018 | Courey et al. | |
| 2021/0008922 A1 | 1/2021 | Meersseman et al. | |
| 2021/0285227 A1 * | 9/2021 | Li | .................... E04F 15/02161 |
| 2023/0083165 A1 * | 3/2023 | Li | ........................ E04F 15/107 |
| 2023/0087380 A1 * | 3/2023 | Li | ........................... B32B 3/30 |
| | | | 52/311.1 |

FOREIGN PATENT DOCUMENTS

| | | | |
|---|---|---|---|
| EP | 2877349 A1 | 6/2015 |
| EP | 3348420 A1 | 7/2018 |
| WO | 9747834 A1 | 12/1997 |
| WO | 2020196377 A1 | 10/2020 |
| WO | 2021140492 A1 | 7/2021 |

* cited by examiner

DECORATIVE PANEL, AND DECORATIVE PANEL COVERING

CROSS-REFERENCE TO RELATED APPLICATIONS

This application is the United States national phase of International Application No. PCT/EP2022/053501 filed Feb. 14, 2022, and claims priority to The Netherlands Patent Application No. 2027548 filed Feb. 12, 2021, the disclosures of which are hereby incorporated by reference in their entireties.

BACKGROUND OF THE INVENTION

Field of the Invention

The invention relates to a decorative panel, in particular a floor panel, ceiling panel or wall panel. The invention also relates to a decorative panel covering, such as a decorative floor covering, decorative ceiling covering or decorative wall covering, comprising a plurality of panels according to the invention, wherein the panels are preferably interconnected.

Description of Related Art

Laminated panels comprise a decorative layer having a decorative pattern which typically has the appearance of a wood pattern. The decorative layer is covered by a transparent layer to preserve and protect the decorative layer. In order to improve the optical and haptic appearance of the decorative pattern of the decorative layer, impressions can be realized in the transparent layer, this in order to obtain an e.g., imitation of wood pores and other unevennesses which can be present at the surface of real wood. Notwithstanding the use of such impressions, also known as embossing, the known panels show the disadvantage that the imitation effect still is not optimum. So, for example, they show the disadvantage that if one looks at such floor panels at a relatively small angle, a light refraction at the transparent layer of synthetic matter is created, as a result of which only a glossy surface can be seen, without any visible effect of the actual print being perceived.

SUMMARY OF THE INVENTION

It is an object of the invention to provide an improved panel having an improved embossing effect.

This object can be achieved by providing a decorative panel as described herein, comprising: a core provided with an upper side and a lower side, a decorative top structure affixed, directly or indirectly, on said upper side of the core, said decorative top structure comprising: at least one decorative print layer forming at least one décor image, and at least one substantially transparent or translucent cover layer covering said decorative print layer; wherein at least one layer of the decorative top structure comprises at least one digitally created first texture. Preferably, the upper side of the core and/or at least one layer of the decorative top structure comprises at least one mechanically created second texture. The decorative print layer is preferably realized by means of digital printing, being a method of printing from a digital-based (decorative) image directly to a media, such as the core and/or an optional primer layer and/or an optional base coat. Preferably, a white base coat is provided onto the primer layer and/or the core to prevent darker or lighter spots from shining through the decorative image after it is printed. The white base coat may optionally be considered as primer layer. The white base coat may for example be formed by a PVC film, in particular a PVC coating. The base coat is preferably an opaque base coat to cover a possible dark colour of the core and/or primer layer. As printing device(s), one or more inkjet printers and/or laser printers may be used. Each layer covering said decorative print layers is preferably (semi-)transparent and/or translucent. This allows the printed decorative image to remain visible. The printed décor image(s) may be based on the CMYK colour principle where the white colour is typically provided by the surface of the white base coat (if applied). This is a 4-color setup comprising cyan, magenta, yellow and black. Mixing these together will give a colour space/gamut, which is relatively small. To increase specific colour or the total gamut spot colours may be added. A spot colour may be any colour. One or more additional colours may be applied, such as at least one additional colour selected from the group consisting of: orange, green, blue, red, white, light grey, light magenta, and light cyan. These colours may be used separately or in combinations. The colours are typically mixed and controlled by a combination of software and hardware (print engine/print heads).

The panel according to the invention is provided with multiple textures, in particular a digitally created embossing structure and a mechanically created embossing structure. This provides substantially more freedom to design accurate embossing and/or debossing designs with a high level of detail, not only because a mechanically applied texture and a digitally applied texture can be combined in various ways, but also because an infinite number of texture design variations can be realized by (varying) the digitally applied texture. The plural texture provides a more pronounced (rough and hilly) embossing structure, wherein relatively deep embossings, such as, for example, an artificial knothole, grouts, grooves, brushstroke structures, plastering techniques such as rubbing plaster, spatula techniques, natural and organic structures, stones or artificial animal skin, like e.g. crocodile skin, may be created, which leads to a more realistic appearance of the panel as such. The digitally created first texture and/or the mechanically created second texture may also be used to create one or more bevels and/or one or more grouts, preferably located at one or more panel edges, but which may also artificially and visually divide the panel into two or more smaller panels (subpanels). For example, by means of a press mould, such as a press plate, bevels and/or grouts may be mechanically pressed into the core and/or the decorative top structure. Typically, the mechanically created embossing (defining the second texture) could be used to cost-efficiently create a basic embossing structure, in particular basis embossing pattern, which may be a relatively intense (i.e. deep) embossing structure. The digitally created embossing (defining the first texture) is typically used to improve the second texture to realize an overall texture which has a more realistic light effect as well as a better depth effect, and hence haptic effect, wherein the colours of the décor image are typically better perceptible. At least a part of the first texture and at least a part of the second texture may be in an offset position. Preferably at least a part of the first texture and at least a part of the second texture may be aligned (in register) with each other to realize a more amplified (intense) embossing, more preferably a more amplified (intense) embossing which is position-selectively applied, in particular in line with a decorative image of the decorative print layer. The digitally created first texture is at least partially realized by means of digital printing. In this respect, digital printing can be used to, either directly or indirectly, generate indentations (cavities or recesses, such as grooves) and/or elevations (protrusions). The mechanically created second texture(s) is preferably at least partially, and typically entirely, realized by providing the core and/or at least one layer of the decorative top structure with one or more impressions and/or one or more engraves. These impressions (or engraves) are grooves, cavities or recesses which are pressed or otherwise applied into said layer e.g. by using a press mould, such as a press plate or press roll. Alternatively, and optionally additionally, the mechanically created second texture(s) is created in another manner, for example by means of material removal, such as e.g. by milling, brushing, and/or blasting.

Preferably, the decorative top structure comprises a plurality of substantially transparent or translucent cover layers covering said decorative print layer, comprising at least one, preferably at least partially digitally printed, base cover layer, and at least one, preferably at least partially digitally printed, textured cover layer, covering said base cover layer, wherein said textured cover layer comprises at least one digitally created first texture, wherein the upper side of the core and/or at least one layer of the decorative top structure comprises at least one mechanically created second texture, wherein, preferably, at least one second texture is located at at least one panel edge and preferably forms at least one bevel and/or at least one grout. Here, the printed base cover has as primary function to shield and hence protect the decorative print layer, while the textured cover layer applied, directly or indirectly, onto said base cover layer has as primary function to bear at least one desired first texture and/or second texture. Preferably, the base cover layer is free of any first texture, although it is imaginable that a part of the base cover layer is provided with at least one first texture and/or at least one second texture. The textured cover layer typically also contributes to the protection of the decorative print layer. Preferably, each cover layer acts as wear layer.

As mentioned above, preferably at least one grout and/or at least one bevel is applied. A grout and bevel compensate visible height differences in between adjacent panels, and moreover typically leads to a more attractive design, wherein a grout (also referred to as grout line) may imitate a traditional grout present in between traditional ceramic, stone, or marble tiles. In cross-section, a bevel is preferably a flat or (convexedly) curved, inclined chamfer, preferably applied at at least one panel edge, which together with a bevel of an adjacent panels forms a substantially V-shaped groove. A grout is preferably at least partially concavely curved as seen from a cross-sectional view. Preferably, a grout of a panel abuts or faces a substantially vertical side wall (free of any grout) of an adjacent panel, in installed condition of the panels. Preferably, at least one grout and/or at least one bevel comprises a textured upper surface and/or a (decorative) coating, such as an opaque coating and/or coloured coating, may further improve the look and feel of the decorative panel. The decorative coating may e.g. separate from the decorative print layer, and is preferably formed by a lacquer, a paint or a transfer foil. It is however imaginable that the decorative print layer extends to and within or underneath the entire grout and/or entire bevel, which would or could make a separate coating unneeded and/or undesired.

Preferably, at least one grout is formed by at least one exposed portion extending along a length of at least one edge, wherein said at least one exposed portion extends outwardly below and away from and/or intersecting (dividing) a top surface of the panel, and is at least partially defined by the decorative top structure, preferably partially defined by a sidewall of the textured cover layer. Preferably, the at least one grout is formed by position-selectively removal of material of the decorative top structure, which is preferably realized by means of milling. This material removal may expose one or more layers of the decorative top structure situated underneath an upper layer of the decorative top structure, and/or may expose the core layer. This material removal leads to a thinned section of the textured cover layer. Hence, the second texture may define one or more thinned sections of the textured cover layer. The at least one bevel is preferably at least pressed into the panel, which leads to pressed bevel. The bevel can be impressed directly into the core layer before applying the decorative top structure and/or can be impressed after application of the decorative top structure. During pressing of the bevel the core and/or decorative top structure are deformed. Preferably, the material density of the core layer and/or the decorative top structure of the portion situated directly underneath the second texture, in particular wherein the second texture defines a bevel, is higher compared to adjacent portions of the core layer and/or the decorative top structure. This is in particular the case in case the core comprises a foamed or densified foam material which is deformed during the impression of the bevel.

Preferably, at least one, and more preferably each, cover layer is at least partially digitally printed. Each cover layer is preferably at least partially composed of transparent or translucent, cured ink. The ink compositions may differ per cover layer. Also the curing process, typically needed to harden the ink, may vary per cover layer. The ink composition and/or curing process may influence the gloss level (also referred to as glossiness) of the cover layer. The gloss level is typically expressed in gloss units (GU), which is normally measured by means of a gloss meter. The GU scale is a scaling based on a highly polished reference black glass standard with a defined refractive index having a specular reflectance of 100 GU at the specified angle. This standard is used to establish an upper point calibration of 100 with the lower end point established at 0 on a perfectly matte surface. For decorative panels, preferably is use made of standard ASTM D523, DIN EN ISO 2813, and/or EN ISO 7668. Preferably, though not necessarily, the measurement angle, referring to the angle between the incident light and the perpendicular, is either $20°$, $60°$, and $85°$, wherein $85°$ is often preferred for decorative panels according to the invention. Preferably, the textured cover layer has a higher gloss level than the base cover layer, which means that the textured cover layer is preferably more glossy than the base cover layer. Preferably, the base cover layer is a matte base cover layer, preferably with a gloss level of 5 GU or less (preferably measured with a measurement angle of $85°$). Preferably, the textured cover layer is a glossy textured cover layer, preferably with a gloss level above 5 GU, and more preferably in between 5 and 10 GU (preferably measured with a measurement angle of) $85°$. This will lead to an attractive and improved realistic depth effect, due to a shadow perception created by matte valleys and glossy borders. A relatively matte appearance (low gloss level) can e.g. be obtained by at least partially curing the base cover layer by means of at least one xenon lamp and/or by means of electron beam (EB) curing. An electron beam (EB) is a bundle, also referred to as a beam, of moving (and initially accelerated) electrons having a certain amount of energy. The electrons of the beam are gathered together in space and moving in the same direction. By using this EB, initially liquid material can be hardened into at least partially, preferably entirely, solid materials. This process is called EB curing. Electron accelerators used to produce an EB are preferably low-energy electron accelerators. EB accelerators can be made in a number of ways: (i) cathode ray tubes (CRT) that sweep or scan the process area, (ii) electron wide-area curtains and (iii) sealed vacuum tube systems. The EB curing mechanism fundamentally differs from the traditionally used UV curing mechanism. In the UV curing mechanism, at least one photo-initiator absorbs UV light and generates free radicals (or cations) that trigger the polymerization and cross-linking of monomers and oligomers with unsaturated double bonds (or epoxy groups), wherein all new bonds within a layer (intralayer) are generated through the cross-linking polymerization of unsaturated double bonds (or epoxy groups). During EB curing, the EB randomly generates free radicals, including cationic radicals, anionic radicals and monomer and oligomer cleavage radicals, to trigger the polymerization and cross-linking of monomers and oligomers with unsaturated double bonds, wherein the randomly generated free radicals themselves can also cross-link or bond the unsaturated (uncured) layer(s) to produce cross-linking and can even react with the layer(s), which is referred to as grafting, resulting in a wider and more complex range of new bonds, which, inter alia, leads to a cured layer with an increased hardness, and therefore an improved impact resistance, which is in favour of the lifespan of the panel as such. Moreover, due to the wider and more complex range of bonds, typically resulting in a relatively high cross-link density and/or an increased cross-link depth (due to the higher penetration depth), volatile substances, such as odorants, plasticizers, and/or toxic or non-toxic substances, initially present within the panel can be preserved within the panel, as the EB cured layer(s) is/are relatively impermeable for those substance. An additional advantage of EB curing is that expensive photo-initiators are no longer needed in the layer(s) which are to be entirely cured by means of EB curing, which reduces the cost of the layer composition. Moreover, omitting to apply photoinitiators will prevent, during and after production, residual photoinitiators and photolysis products migration and volatilization, causing unpleasant odours. Furthermore, EB curing can be performed in a relative energy-efficient manner, which is (significantly) more energy saving than thermal curing (UV curing). Hence, EB curing has significant advantages over traditional UV curing. Unlike UV curing, where photons emitted by an ultraviolet (UV) lamp, such as a mercury or gallium lamp, have only minuscule mass and are easily stopped at the surfaces of materials, electrons have much more mass and can penetrate films. Thick and opaque films can be cured with electron beams. As the EB voltage increases, so does the electron energy—and the depth of cure. Hence, by means of EB curing, the penetration depth can be regulated, dependent on the energy density used, which makes EB curing not only suitable for curing of single layer of the covering structure of the panel according to the invention, but also to simultaneously and/or successively curing a plurality of (initially uncured) layers of the covering structure, up to several millimetres or even several centimetres thick. Moreover, contrary to UV curing, EB curing allows double-sided curing, which makes it e.g. possible to cure at least a part of the covering structure and at least a part of a backing layer applied to a rear side of the core and/or the core itself and/or any other layer of the panel. Atmospheric oxygen typically reacts very quickly with carbon-centered radicals to give slow-reacting peroxy radicals, which effectively inhibit the EB curing process. Because of this oxygen-inhibition effect, it is preferred for EB curing to use an inert gas to displace oxygen from a reaction chamber (reaction space) of an EB unit (EB curing station) where the curing occurs. This is usually accomplished by purging the reaction chamber with high-purity nitrogen.

A more glossy appearance (higher gloss level) can e.g. be obtained by at least partially (UV) curing the textured cover layer (or another layer of the decorative top structure) by means of at least one mercury lamp and/or at least one gallium lamp.

As already addressed above, the first texture is preferably at least partially defined by at least one, at least partially cured base layer being provided with a plurality of indentations. Like the mechanically applied impressions these indentations constitute cavities and/or recesses, such as groove, and the like, which could have an equivalent look and feel appearance. However, during the formation of the impressions panel material is typically merely deformed, which during the formation of the indentations panel material is typically removed from the panel, either chemically and/or mechanically. Different embodiments of these indentations are described in more detail below.

Preferably, a part of the base layer is provided with said plurality of indentations, and wherein another part of the base layer is free of indentations. Hence, in this embodiment, the base layer is merely partially embossed. At least a part of the part of the base layer which is free of indentations may be used to create (build) elevations, preferably by means of digital printing.

It is imaginable that the plurality of indentations of the base layer forms a discontinuous and/or a continuous indentation pattern. It is also imaginable that the plurality of indentations of the base layers forms a regular indentation pattern. Typically, the indentation pattern to be realized is strongly, or even completely, dependent on at least one décor image of the decorative layer.

Preferably, the base layer is a printed base layer. This means that the base layer, initially in liquid state, is printed, either directly or indirectly on top of the decorative layer. Alternatively, the base layer may be applied, in an initially liquid (uncured) state, by means of a roller coater. One or more indentations may be provided in the base layer when the base layer is still in liquid state and/or one or more indentations may be provided in the base layer during and/or after—partially or fully—curing (solidifying) the base layer.

Providing one or more indentations in the liquid base layer is preferably done by means of chemically embossing. To this end, preferably (small) reactive droplets of an embossing liquid are position-selectively digitally printed, or sprayed, onto the liquid base layer to cause a chemical reaction between the material of the printed droplets and the still liquid base layer, wherein the subsequent reaction product changes the structure at this location of the base layer optically and/or haptically. Alternatively, providing one or more indentations in the liquid base layer may be realized by means of a combination of digital printing and subsequent mechanical action to remove panel material position-selectively. To this end, droplets of an (alternative) embossing liquid may be deposited, preferably digitally printed, onto the still liquid (uncured) base layer, in a position-selective manner. This means that the embossing liquid is applied on portions of the base layer where indentations will have to be formed. After application of this embossing liquid, the base layer is preferably at least partially cured, e.g. by means of ultraviolet (UV) radiation. During this irradiation step, the base layer is typically polymerized, but wherein the portions of the base layer enriched with the embossing liquid will remain (sufficiently)

liquid and/or soft to allow subsequent and/or simultaneous removal of these soft portions. This soft portion removal can be realized e.g. by means of mechanical action, such as by means of a rotating brush, but may also be realized by forcing the soft portions to evaporate, preferably by means of infrared (IR) beams and/or by means of hot air and/or by means of a suction device (vacuum device) and/or by any other extraction technique. Alternative material removal methods, like material removal by using a laser beam, an electron beam, or a water beam, are also conceivable in this respect. In this embodiment, it is preferred that the base layer is a hydrophobic base layer, which facilitates that water based embossing liquid droplets ejected by a digital printing device will stay as droplets at a predefined locations during the subsequent curing process step. Hence, preferably at least one first texture is a digitally printed, negatively patterned first texture, preferably realized by printing a plurality of droplets on a still untextured textured cover layer, such that the thickness of the textured cover layer is changed on the positions where the droplets are printed onto to form indentations in the textured cover layer, and which will define the eventual textured cover layer.

The base layer is preferably a curable resin, which is initially applied in liquid state. The resin can be cured by means of electromagnetic radiation, such as UV or IR radiation, and/or can be cured by electronic beam curing (EBC), wherein electrons are typically shot at high velocity on the base layer to harden (cure) the base layer. The base layer may, for example, be at least partially composed of melamine, polyurethane, epoxy resin and/or any (other) photocurable resin. The base layer may, for example, (also) at least partially composed of epoxy acrylates, urethane acrylates, polyester acrylates, polyether acrylates, amino acrylates, silicone acrylates, polyisoprene acrylates, polybutadiene acrylates and acrylate monomers, wherein the term acrylates includes both acrylate and methacrylate resins. Also vinyl monomers may be used to compose the base layer at least partially, wherein in this case preferably N-vinyl caprolactam (NVC), acryloyl morpholine (ACMO), diethylene glycol divinyl ether (DVE-2), triethylene glycol divinyl ether (DVE-3) and/or mixtures thereof, is/are used. The base layer may contain solid particles in an amount of at least 20% by weight with respect to the weight of the base layer.

In case an embossing liquid is used to realize the indentations in the base layer, the embossing liquid preferably comprises at least one constituent chosen from the group consisting of: water, a water based substance, silicone, silicone polyether, silicone acrylate, and silicone polyether acrylates. The presence of silicones typically improves the embossability of the base layer and provides a natural appearance to the treated coating, which may be particularly appreciated from an aesthetic point of view.

Providing one or more indentations in the base layer during or after curing may be done by either chemical embossing (as described above) and/or by mechanical embossing. In this respect, it is noted that the base layer may (additionally or alternatively) be subjected to a laser beam or particle beam, such as a water beam or electron beam to cure the base layer.

Preferably, the indentations provided in the base layer have a depth situated in between 2 micron and 100 micron, preferably situated in between 3 micron and 50 micron. Preferably, the elevations of the elevated pattern layer have a height situated in between 2 micron and 500 micron, preferably situated in between 3 micron and 300 micron. The total embossing depth is determined by the sum of the greatest indentation depth and the greatest elevation height. In case a plurality of base layers and/or a plurality of elevated pattern layers is applied, an increase of the total embossing depth can be achieved. Typically, the elevated pattern layer is realized by means of digital printing, in particular 3D digital printing. Preferably, a digital printing device is used to apply at least one layer of the panel according to the invention, which comprises one or more digitally controllable orifices, each of which is/are configured to eject droplets of a hardenable liquid to generate the elevated pattern layer and/or another panel layer, such as an (even or uneven (textured)) intermediate layer or a top coating. The layer thickness typically corresponds to the ejected liquid on the surface. In a preferred embodiment, the hardenable droplets being ejected such that at least two layer portions are formed by different hardenable liquids, wherein said layer portions are typically located side by side and adjacent to and/or at a distance from each other. More preferably, one of the liquids hardens to a layer being impervious to light, another of the liquids hardens to a layer being transmissive to light. This provides opaque and transparent portions in the elevated pattern layer, which provides more freedom of design of the decorative top structure, and hence of the panel as such. This, for example, makes it possible that a transparent layer portion at least partially borders an opaque layer portion. The two different hardenable liquids used in this process step could be either miscible or immiscible with each other.

In a preferred embodiment, at least a part of the indentations of the base layer is aligned in register with at least a part of at least one decor image formed by the decorative print layer.

In a preferred embodiment, at least a part of the indentations of the base layer is aligned in register with at least a part of at least one décor image formed by the decorative print layer, in particular at least one pattern defined by at least one décor image formed by the decorative print layer. Preferably, at least a part of the elevations of the elevated pattern layer is aligned in register with at least a part of at least one décor image formed by the decorative print layer. By applying an alignment in register, also referred to as embossing in register, a very realistic and/or artistic design and appearance of the panel can be realized. The décor image may be formed by a wood pattern. However, it is well thinkable that the décor image represents another kind of pattern, such as, for example, a customized picture and/or a mosaic pattern or tile pattern. In case of a mosaic pattern or tile pattern, artificial tiles may be depicted which are aesthetically separated by one or more grouts. Here, the embossing structure applied may comprise a base layer having thicker layer parts covering the artificial tiles and thinner layer parts covering one or more grouts. Here, it is also imaginable that elevations of the elevated pattern are predominantly or merely covering the artificial tiles and less or not at all the artificial tiles. In this manner, a realistic surface relief can be realized which is practically equal to the surface relief obtained when using real tiles and grouts.

In a preferred embodiment, the first texture is at least partially defined by at least one at least partially cured elevated pattern layer formed by a plurality of printed elevations. In this respect, the elevated pattern layer is preferably realized by means of printing, in particular digital printing, and defines a (printed) positive embossing layer. The elevations (protrusions) are preferably provided on top of said negative embossing layer formed by the indentations (recesses) applied in the aforementioned base layer. This means that said elevated pattern layer is preferably printed on top of said base layer. Typically, an upper side of the base layer defines an embossing base level, and wherein the indentations and at least a part and/or at least a number of the elevations are situated at opposite sides of said embossing base level. It is also imaginable that the indentations and at least a part and/or at least a number of the elevations are situated at the same side of said base level.

As already indicated above, the elevations, of at least a part thereof and/or a number thereof, are preferably printed on the part of the base layer which is free of indentations, which leads to an increased depth effect of the embossing structure as such.

Typically, an upper side of the base layer defines an embossing base level, and wherein the indentations and at least a part and/or at least a number of the elevations are situated at opposite sides of said embossing base level. It is also imaginable that the indentations and at least a part and/or at least a number of the elevations are situated at the same side of said base level.

Preferably, the elevations of the elevated pattern layer have a height situated in between 2 micron and 500 micron, preferably situated in between 3 micron and 300 micron. Preferably at least one impression of the second texture has a depth of at least one 0.4 micrometre. The total embossing depth is determined by the sum of the greatest indentation and/or impression depth and the greatest elevation height. In case a plurality of base layers and/or a plurality of elevated pattern layers is applied to define the first texture, the total embossing depth of the first texture and the texture can be enlarged significantly, leading to more realistically experienced artificial visual and haptic effects. Here, the total embossing depth, as measure from a top surface of the panel, may be more than 700 micron, even more than 800 micron, and even more than 900 micron. In case the second texture is at least partially applied in an upper side of the core, the total embossing depth can be enlarged even further, depending on the core thickness.

Preferably, at least a part of the elevations of the elevated pattern layer is aligned in register with at least a part of at least one decor image formed by the decorative print layer, in particular at least one pattern defined by at least one décor image formed by the decorative print layer. To this end it is conceivable that at least one 3D camera is used to determine (analyse) a relief pattern of a physical sample piece. After determining the pattern specialized software can be utilized to translate the image to a three-dimensional model of the sample piece. A 3D printer can be configured to print the indentations and/or elevations in register with the three-dimensional model. As such, an indentation pattern and/or elevated pattern layer could be obtained substantially without the need for manually setting or determining locations for the indentations and/or elevations. A sample piece could for example be a piece of natural wood, a natural stone or the like, such that the 3D camera could provide the most naturally looking surfaces.

The impressions are preferably obtained by means of at least one pressing mould, such as a pressing plate and/or an embossing roll. Typically this pressing mould is provided with an inverse impression of the selected second texture. During realizing the second texture, the pressing mould will be pressed against a panel surface to be textured, wherein typically also heat is applied. This latter can be realized, for example, by using a heated pressing mould. Here, it is for example imaginable that the pressing mould is pressed with a pressure of 25-bar onto the (unfinished) panel. The temperature applied may vary, but is typically situated between 150 and 200 degrees Celsius. The pressing mould is typically pressed onto the (unfinished) panel for a period of time of 0.5-50 seconds. Alternatively or additionally, the second texture can be applied by any other type of mechanical action, such as brushing, drilling, milling, engraving and/or scratching, although this other type of mechanical action typically leads to a more randomly shaped second texture rather than a predefined second texture which is obtained by using a pressing mould. It is imaginable that not only the core is provided with the second texture, but that also one or more layers of the decorative top structure is/are provided with said second texture. This second texture may be realized in a single pressing step. In this case, it is not unlikely that the decorative print layer is (slightly) deformed as well. Since the deformation of the decorative print layer is predefined and known in advance, it is imaginable that the initially printed image of the decorative print layer is adjusted in advance such to compensate the deformation of the print layer during impression. This will result in an image which does not look to be deformed at all.

Preferably, at least a part of the impressions of the second texture is aligned in register with at least a part of at least one décor image formed by the decorative print layer, in particular at least one pattern defined by at least one décor image formed by the decorative print layer. The one or more impressions may consist of successive short impressions, and/or of longer, uninterrupted, possibly bent impressions. Other designs are obviously not excluded.

In case the image of the decorative print layer represents a wood (nerves) pattern, it is often desired that the location and/or shape of the impressions is in function of at least a part of the wood pattern, with which it is meant in the first place that these impressions are realized in function of the wood nerves and possibly additionally in function of the wood pores. In the case of short impressions, these can be directed with their length according to the printed wood nerve and/or can be directed with their longitudinal direction, and preferably also follow the wood nerves.

In an alternative embodiment of the panel according to the invention, at least one second texture is created by means of an applicator roll, wherein a material layer is initially applied to the applicator roll and subsequently be transferred onto a surface of the (unfinished) panel, wherein said material layer is textured by means of the applicator roll and/or by means of a plurality of digitally controlled gas nozzles which are configured to blow gas, in particular air, onto the material layer born by the applicator roll in order to transform (texture) said material layer prior to transferring the material layer onto a surface of the (unfinished) panel. Dependent on the gas nozzle control, this may lead to a material layer having a random second texture or having a predefined second texture.

Preferably, at least one impression has a depth which exceeds the nominal thickness of the decorative top structure. This implies that the core that said at least one impression causes a core deformation. As indicated above, it is imaginable that the at least one impression is provided in the core only, and that the super-positioned decorative top structure is following the second texture realized in this manner.

It is imaginable and often efficient that the maximum depth of the second texture exceeds the maximum depth of the first texture, with respect to a top surface of the panel. It is however also imaginable that the maximum depth of the first texture exceeds the maximum depth of the second texture, with respect to a top surface of the panel.

In a preferred embodiment, at least one cover layer, preferably at least one wear layer, of the decorative top structure comprises the first texture. This first texture typically leaves the decorative print layer intact (unaffected/undeformed). It is imaginable that at least one cover layer, preferably at least one wear layer, of the decorative top structure comprises the second texture. The second texture may be such that the second texture deforms the decorative print layer. However, the second texture may also be such that the second texture does not deform the decorative print layer, and leaves the decorative print layer intact.

Preferably, at least one first cover layer, more preferably at least one first wear layer, of the decorative top structure comprises the first texture, and wherein at least one second cover layer, preferably at least one second wear layer, of the decorative top structure the second texture. It is imaginable that the second texture is also at least partially present in the first cover layer. And vice versa, it is imaginable that the second texture is also at least partially present in the first cover layer, although this is typically less likely due to the different application method of the first texture.

In a preferred embodiment, the decorative top structure comprises at least one wear layer and at least one top coating, preferably a UV hardened top coating, covering said wear layer(s). Typically, this top coating defines an upper surface of the panel. The top coating is often a lacquer layer which is at least partially hardened (cured) by means of (UV) irradiation. In this respect, it is often preferred to firstly harden (cure) the first texture at least partially, before hardening (curing) the top coating, in particular the lacquer layer. The lacquer layer can comprise any suitable known abrasion-resistant material, such as an abrasion-resistant macromolecular material coated onto the layer beneath it, or a known ceramic bead coating. If the top coating is furnished in liquid form, it can be bonded to the layer beneath it by curing the top coating. The top coating can also comprise an organic polymer layer and/or inorganic material layer, such as an ultraviolet hardened or hardenable coating or a combination of another organic polymer layer and an ultraviolet hardened or hardenable coating. The top coating may be provided with at least one antimicrobial substance to increase the antimicrobial resistance of the panel as such. In an embodiment of a panel according to the invention, at least a part of the (first and/or second) texture of the panel is left uncovered by the top coating. In this manner, a further embossing effect (relief effect) can be achieved, and/or in this way glossy and matt areas may be created in this manner, which may further contribute to a desired aesthetical appearance of the panel as such. In this respect, it is for example imaginable that the décor image of the decorative print layer is formed by artificial tiles separated by grouts, the artificial tiles may be covered by the lacquer layer to provide these tiles a glossy effect, while the grouts are left substantially uncovered by the lacquer layer to maintain a more matt appearance.

Preferably, at least a part of the decorative layer is positioned below the first texture and the second texture. It is imaginable that the decorative print layer is at least partially deformed by the second texture, but it is also imaginable that the decorative print layer is not deformed by the second texture and stays intact. In case the decorative print layer is foreseeable deformed by the second texture, it is preferred to print the image in a slightly modified format during printing to compensate a subsequent deformation during application of the second texture. However, it is also imaginable that it is preferred from an aesthetical point of view to purposively create a deformed decorative print layer, for example by printing said decorative print layer onto a textured surface and/or by deforming the decorative print layer after application thereof. This could lead to an improved visual depth effect.

It is imaginable that at least a part of the decorative print layer is positioned in between the first texture and the second texture. In this case, it is imaginable that the decorative print layer is positioned on top of the first texture, and that the second texture is positioned on top of the decorative print layer. It is also imaginable that the decorative print layer is positioned on top of the second texture, and that the first texture is positioned on top of the decorative print layer.

It is imaginable that at least one first texture is positioned below at least one second texture, and/or that at least one first texture is positioned above at least one second texture. It is imaginable that at least one second texture is applied underneath the decorative top structure. It is imaginable that at least one second texture is applied in the core layer. Various configurations are conceivable in this respect.

Preferably, the panel comprises a top surface, wherein the first texture and/or the second texture define at least partially the relief (texture) of said top surface. Here it is imaginable that at least one texture present within the panel is substantially no longer or barely present at the top surface, typically because the applied texture is undone by at least one super-positioned layer. This latter may be advantageous to create a visible textured decorative print layer, e.g. to create improved depth effects, wherein said textured is no longer desired, or at least not at the full initial roughness level, at the top surface of the panel as such.

In a preferred embodiment, the top surface of the panel according to the present invention has an average roughness (Ra) larger than 15 µm, preferably larger than 17 µm and most preferably larger than 20 µm. The average roughness Ra, also called surface roughness, is preferably smaller than 500 µm, more preferably smaller than 400 µm and most preferably smaller than 350 µm, in particular smaller than 300 µm. The maximum roughness (µm) can obviously be larger than the aforementioned values, and may exceed 500 µm, which is for example desirable in specific designs, such as in designs having one or more artificial (wooden) knotholes. The average roughness (Ra) is the arithmetic average of the absolute values of the roughness profile ordinates (vertical coordinates with respect to a roughness mean line). Also known as Arithmetic Average (AA), Center Line Average (CLA). The average roughness is the area between the roughness profile (defining the texture) and its mean line, or the integral of the absolute value of the roughness profile height over the evaluation length It is imaginable and could be preferable that at least one visible panel layer, such as a top coating, or any other layer of the decorative top structure has a changing degree of gloss in at least one direction extending parallel a plane defined by the panel. In this way, glossy and matt areas could be created which could be beneficial from an aesthetic point of view. This changing degree of gloss could at least partially be aligned with and/or adjusted to the décor image of the decorative print layer. Preferably, during production the initially hardenable top coating is irradiated with shortwave UV light and/or an electron beam, typically having a wavelength smaller than 200 micron, to harden (cure or polymerise) the top coating, such that micro-creasing occurs, which leads to an extremely matt optical structure. Preferably, at least one UV irradiation step is performed under inert conditions. This latter is preferably realized by applying an atmosphere consisting of one or more of the following gases: helium, neon, xenon, krypton, nitrogen, and/or carbon dioxide. Depending on the composition of the substance to be cured, UV curing of a substance may cause oxygen inhibition. The oxygen inhibition effect typically occurs in free radical UV systems.

Oxygen inhibition means that oxygen, a very reactive gas, also reacts very quickly with free radicals formed from acrylate double bond systems after the reaction between oxygen and these free radicals stops the polymerisation process at the surface of the coating or printing ink. In consequence the coating or printing ink will remain tacky on the surface, while deeper layers have cured properly. Properties like scratch resistance and chemical resistance will be dramatically reduced by this undesired effect, which can be prevented by applying said inert atmosphere.

The height of the micro-creasing is typically of the order magnitude of 100 nm. More preferably, the top coating is additionally depth-structured, forming structuring depressions to provide the top coating with an additional texture, which might be the second texture. It is imaginable that the top coating has or is provided with at least one glossy lacquer layer.

It is imaginable that the panel comprises a plurality of decorative print layers. It is imaginable, and typically preferable, that at least one decorative print layer is a continuous (uninterrupted) layer. It could also be preferred that at least one decorative print layer is a discontinuous (interrupted) layer covering only a portion of a layer positioned underneath. Typically, at least one backing layer is affixed to a lower side of the core. Non-limiting examples of materials whereof the backing layer can be made of are polyethylene, cork, polyurethane and ethylene-vinyl acetate. The thickness of a polyethylene backing layer is for example typically 2 mm or smaller. The backing layer commonly provides additional robustness and impact resistances to each tile as such, which increases the durability of the tiles. Moreover, the (flexible) backing layer may increase the acoustic (sound-dampening) properties of the tiles.

In a preferred embodiment, a first panel edge comprises a first coupling profile, and a second panel edge, preferably opposite to the first panel edge, comprising a second coupling profile being designed to engage interlockingly with said first coupling profile of an adjacent panel, both in horizontal direction and in vertical direction, wherein the first coupling profile and the second coupling profile are preferably configured such that two of such panels can be coupled to each other by means of a lowering movement (fold-down movement). In case the panel is rectangular, then the first panel edge and second panel edge are typically situated at opposite short edges of the panel. The panel preferably also comprises at least one third coupling profile and at least one fourth coupling profile located respectively at a third panel edge and a fourth panel edge, wherein the third coupling profile comprises: a sideward tongue extending in a direction substantially parallel to the upper side of the core, at least one second downward flank lying at a distance from the sideward tongue, and a second downward groove formed between the sideward tongue and the second downward flank, wherein the fourth coupling profile comprises: a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement (angling down movement), wherein, in coupled condition: at least a part of the sideward tongue of a first panel is inserted into the third groove of an adjacent, second panel, and wherein at least a part of the upward locking element of said second panel is inserted into the second downward groove of said first panel.

The core may be flexible, semi-rigid or substantially rigid. The core may be solid or at least partially foamed. The core may comprise at least one polymer selected from the group consisting of: ethylene vinyl acetate (EVA), polyurethane (PU), polyethylene (PE), polypropylene (PP), polystyrene (PS), polyvinylchloride (PVC), polyethylene terephthalate (PET), Polyisocyanurate (PIR), or mixtures thereof. The core may comprise at least one wood-based material. The core may comprise at least one composite material of at least one polymeric material and at least one non-polymeric material. The at least one non-polymeric material is preferably selected from the group consisting of: talc, chalk, wood, calcium carbonate, and a mineral filler. The core may comprise magnesium oxide and/or magnesium hydroxide and/or silicon carbide (embedded in a resin matrix). The upper side of the core is preferably substantially flat. At least one core layer may be at least partially be composed of recycled material, preferably a mixture of virgin and recycled material of the same polymer (type).

The core may comprises a plurality of core layers, such as two or more co-extruded core layers (sublayers), which may subsequently be laminated in a calendering device and/or in an alternative manner. Preferably at least one core layer, more preferably each core layer comprises a thermoplastic polymer. It is however also imaginable that at least one core layer is free of thermoplastic polymer. This allows, for example, that the core is provided with at least two zones (sublayers) of different composition. Such zones may be obtained, for example, by means of co-extrusion. The different compositions in different zones may result in mutually different features, such as, for example, in respect to elasticity, colour, adherence, smoothness of the surface, processability and the like. Different compositions in different zones may, for example, be based upon different ratios between polymeric material, in particular thermoplastic material (like PVC and/or TPU and/or PET and/or PP), and non-polymeric material, in particular filler, more in particular mineral filler (like chalk). For example, to this end, it is imaginable that at least one core layer is relatively stiff or rigid, and another core layer, preferably positioned underneath the first mentioned core layer during normal use, is relatively flexible or soft. Preferably, at least one first core layer has a softer composition and/or a lower Vicat softening point than at least one second core layer. This makes it relatively easy to provide impressions, such as grooves, slots, or alternative cavities, in the first core layer (in viscous state), while the (harder) second core layer can be used to provide the core as such more hardness and/or rigidity. Typically, the Vicat softening point (Vicat softening temperature) is measured according to standards D 1525 and/or ISO 306. It is imaginable that at least two core layers are provided with at least one impressed pattern. It is imaginable and often preferred that a side of at least one core layer, which is provided with at least one impressed pattern, is facing away from an adjacent core layer. Alternatively or additionally, it is also possible that a side of at least one core layer, which is provided with at least one impressed pattern, is facing towards an adjacent core layer. This latter embodiment will enclosing the impressed pattern(s) by said facing core layers. This will typically lead to (air) pockets incorporated within the core as such. The impressed pattern(s) of different core layers may be identical or may be distinctive. At least one of these impressed pattern(s) may be filled, e.g. by a sound dampening material, such as felt, flax, wool, a foamed material, etcetera. It is imaginable that at least one core layer is free of any impressed pattern. At least one core layer may be a reinforcement layer, such as a glass fiber layer and/or a graphene (or derivative thereof) based layer. It is imaginable that at least one core layer is at least partially, preferably substantially entirely, composed of at least one elastic material and/or soft material and/or compressible material. Such a core layer typically improves the user comfort of the panel as such and improves the acoustic properties of the panel. Preferably, such a (comfort) layer comprises a material selected from the group consisting of: a natural rubber, a synthetic rubber, an alternative elastomer, a polyolefin, a foamed polymer, and at least one natural material, preferably a natural material chosen from the group consisting of: cork, bamboo, hemp, linen, flax, jute, sisal, coconut fibers, banana fibers, cotton, felt, and/or leather. The foamed polymer may constitute a closed-cell foam or an open cell foam. Preferably, said foamed polymer is a(n elastically) compressible foamed polymer, such as PVC foam, PU foam, preferably thermoplastic PU (TPU) foam, EVA foam, cross-linked polyethylene foam (XPE), irradiation cross-linked polyethylene foam (IXPE), and expanded polyethylene foam (EPE). XPE foam and IXPE are both closed-cell PE foams, typically with even and fine internal cells are even and fine, wherein the water absorption rate is extremely low, while the sound insulation, heat insulation, shock absorption performance, and mechanical properties are relatively good. It is imaginable that this (comfort) core layer is composed of a plurality of layers, such as e.g. a laminate of at least one polymer (comprising) layer and at least one layer composed of natural material, and/or a laminate of a plurality of polymer (comprising) layers. Non-limitative examples of such laminated core layers are: (i) an EVA layer (ethylene-vinyl acetate) layer with a preferred thickness of between 0.5 and 1.8 mm, laminated with a PE film, with a preferred thickness of between 0.5 and 1.8 mm, and (ii) an expanded polyethylene layer (EPE layer) with a preferred thickness of between 0.5 and 2.5 mm, laminated with a PE film, with a preferred thickness of between 25 micron and 1.5 mm.

This comfort core layer and/or any other core layer may be given a desired colour by adding at least one pigment to the core layer. Preferably, at least one colour of at least one core layer is chosen from the group consisting of: white, yellow, blue, red, green, brown, azure, ivory, teal, silver, purple, navy blue, pea green, orange, maroon, aquamarine, coral, fuchsia, wheat, lime, crimson, khaki, pink, magenta, olden, plum, olive, cyan, or s plurality of colours thereof. This colour is typically visible as seen from a side view of the panel. The colour preferably provides an indication of at least one layer related characteristic of the (comfort) core layer, such as e.g. the layer thickness, the density, at least a part of the material composition, the recyclability, the compostability, the temperature resistance, the moisture resistance, the anti-bacterial properties, the compressibility, the swell rating, the compressive strength, and/or the acoustic dampening (sound absorption). The (comfort) core layer may be provided with a impressed pattern, such as e.g. a waffle pattern and/or a matrix pattern, although alternative patterns are also imaginable. This may improve the comfort properties of the panel, the acoustic properties of the panel, and will lead to an increased contact surface area between the (comfort) core layer and an adjacent layer, which typically will intensify the bonding of said layers. Optionally, at a rear side of the core at least one backing layer may be applied, which typically (further) improves the comfort properties and acoustic properties of the panels. Preferred materials for the backing layer are a natural rubber, a synthetic rubber, an alternative elastomer, a polyolefin, a foamed polymer, such as EPE, XPE, and IXPE, and at least one natural material, preferably a natural material chosen from the group consisting of: cork, bamboo, hemp, linen, flax, jute, sisal, coconut fibers, banana fibers, cotton, felt, and/or leather. The one or more backing layers may be closed and may act as sound dampening membrane. In case more backing layers are applied, these backing layer are preferably laminated on top of each other. Preferably, an elastic and/or compressible and/or soft core layer is situated as intermediate core layer in between two more rigid core layers and/or harder core layers (typically having a higher shore (A) hardness), which leads to a (ABA) sandwich structure. The layers may be glued to each other, but are preferably fused (heat welded) to each other. Such a sandwich structure typically leads to improved ergonomics and sound dampening properties of the core as such, and hence of the panel as such. Such a sandwich pattern typically also allows the upper core layer and the lower core layer to be moved, in particular shift, with respect to each other, due to the flexible (elastic) intermediate core layer situated in between these core layers. This freedom of movement between the upper core layer and the lower core layer is typically restricted to several nanometre up 1 millimetre, but this allows the core, and hence the panel, to compensate external forces during normal use and/or during possible expansion or contraction as a result of temperature difference during use. Such as compensation will be in favour of the user comfort and/or lifetime of the panel.

Preferably, the decorative top structure is unfoamed (non-foamed). This will typically improve the transparency of the cover layer(s) and will therefore improve the visibility of the printed decorative layer of the decorative top structure. Hence, this will lead to improved aesthetics of the panel as such. As indicated above, preferably, the decorative top structure comprises a plurality of cover layers covering the printed decorative layer. More preferably, the print layer is covered by at least one base cover layer, and at least one textured cover layer, and at least one top coating positioned on top of each other. At least one cover layer typically acts as wear layer. Preferably, at least one primer layer is situated in between the decorative print layer and the base cover layer. This will improve the adhesion between the decorative print layer and the base cover layer. Preferably, at least one primer layer is situated in between the core layer and the decorative top structure. Preferably, on top of said primer layer and in between said primer layer and the decorative top structure a basecoat layer, more preferably a white basecoat layer, is applied. This will improve the colouring and appearance of the decorative print layer.

Preferably, at least a part of the lower side of the core layer is provided with at least one impressed and/or excavated pattern which preferably comprises one or more impressed and/or excavated core grooves. The impressed pattern(s) and/or impressed core grooves are preferably (i) realised by means of extrusion, and/or (ii) realised and/or preserved by calendering, including rolling, stamping, or pressing, and/or (iii) by core material removal, preferably by means of etching, and/or by means of milling or scraping. In case of an excavated pattern, the pattern is preferably realized by (position-selectively) milling away material from the core layer. This will lead to a relatively low density panel, and hence leads to a light-weight panel, which is beneficiary from an economic, environmental and logistic point of view.

During the impression of the core grooves and/or alternative pattern, the core is typically just discharged from an extruder, and therefore still in a softened and/or molten state, which should be understood as viscous or paste-like. It is also imaginable to bring the core material in a softened state without extruder or without using extrusion. During production of the core, a hot mass of thermoplastic comprising core material is led through a calendering device with a plurality of, typically heated, facing, but distant calendering rolls to form a (continuous sheet). Since the core material is softened, and even molten, the core can be deformed relatively easily, without having the risk to damage, such as breaking or cracking, the core. Moreover, impressing the grooves into the core when the core is still in a softened state prevents the tools used for impressing the core from excessive wear. As mentioned above, a suitable tool in this situation is a profiled calendering roll, the surface of which is complementary (i.e. a negative) of the profiled core surface (patterned core surface) to be formed on the upper side and/or lower side of the core. In the softened state of the temperature of the core is typically above room temperature. Since thermoplastic material, such as polyvinylchloride (PVC) or thermoplastic polyurethane (TPU), is typically present as constituent of the core, the temperature of the softened core during impression of the core, preferably during calendering, is preferably near or above the melt temperature of the thermoplastic material. Preferably, during the calendering process, also at least a part of the decorative structure, or even the entire decorative structure, is laminated with and affixed to the core, typically after the core has been provided with the impressed core grooves and/or alternative pattern to prevent damaging of the decorative structure.

The core groove may be elongated, but may also be formed by an alternatively shaped cavity or recess. In case elongated core grooves are applied, these core grooves may be linear, non-linear, curvilinear, and/or angular. Instead of impressed core grooves or in addition to impressed core grooves, it is imaginable to provide the upper side of the core and/or lower side of the core with at least one alternative impressed pattern. This alternative impressed pattern is a three dimensional (3D) pattern, which typically comprises impressed portions and untouched (unimpressed) portions. The impressed portions may be composed of intensively impressed portions and less impressed portions. This may, for example, result in a spike pattern, a pyramid pattern, a honeycomb pattern, a stripe pattern, a diamond pattern, a rib-shaped pattern, a pattern based upon frustoconical shapes, a dotted pattern, a stochastic pattern, a non-stochastic pattern. Each cavity (groove) of the impressed pattern may have a curved, in particular circular or elliptical cross-section, or a polygonal cross-section, such as a triangular, square, pentagonal, hexagonal, rhombic, quadrilateral, and/or octagonal cross-section. Preferably, at least a number of cavities (grooves) of the core or at least one core layer have a simple polygonal cross-section, in particular a convex polygonal cross-section. The cavities or grooves as such may be prism shaped, such as a cylindrically shaped, tetrahedron prism shaped, triangular prism shaped, cube shaped, hexagonal prism shaped, or may have a more complex shape, such as e.g. both partially prism shaped and partially polyhedron shaped, such as pyramid shaped, in particular triangular, square, pentagonal, hexagonal, or octagonal pyramid shaped. Preferably, the cavities (or grooves) comply with a Weaire—Phelan structure. This geometric structure is a three-dimensional structure representing an idealised foam of equal-sized cavities with two different shapes. This structure can be a monolayer structure with cavities (2D structure) or a multilayer structure with cavities (3D structure). Alternatively shaped cavities or grooves are also imaginable. The cavities or grooves may be arranged in an identical orientation and/or may have identical dimensions. However, it is also imaginable that a number of cavities (or grooves) have mutually different dimensions and/or shapes and/or orientations. For example, it is imaginable that the impressed pattern(s) is composed of a plurality of sub patterns, wherein the sub patterns may have a same cavity (or groove) layout, but wherein at least two sub patterns have different, e.g. tilted, orientations with respect to the panel. The sub patterns (if applied) may also arranged such that a center portion of the core is provided with the deepest cavities (or grooves), while at least one peripheral portion of the core (i.e. at least one edge portion of the core) is provided with a less deep pattern. This allows coupling profiles to be located at the edge without (seriously) weakening these coupling profiles, while still having some kind of pattern and/or texture at the edge to dampen sound waves and/or to provide the panel with improved anti-slip properties at the rear side of the panel.

The invention also relates to a panel covering, in particular floor covering, ceiling covering, or wall covering, consisting of a plurality of, preferably mutually coupled, panels according to the invention. Here, it is imaginable that at least two panels have a distinctive décor image, wherein each décor image represents a partial image, and wherein the combination of said décor images together form a single image (picture or photo). It could be preferable that the panel covering according to the invention consists of at least two different types of panels. In this respect, it could be preferable that the panel covering (further) comprises a plurality of other decorative panels, comprising: a core provided with an upper side and a lower side, a decorative top structure affixed, directly or indirectly, on said upper side of the core, said decorative top structure comprising: at least one digitally printed decorative print layer forming at least one décor image, and at least one substantially transparent or translucent cover layer covering said decorative print layer, wherein at least one layer of the decorative top structure comprises a digitally created first texture, or wherein the upper side of the core and/or at least one layer of the decorative top structure comprises a mechanically created second texture. Preferably, each panel (type) of the panel covering comprises at a first panel edge a first coupling profile, and at a second panel edge, preferably opposite to the first panel edge, a second coupling profile being designed to engage interlockingly with said first coupling profile of an adjacent panel, both in horizontal direction and in vertical direction, wherein the first coupling profile and the second coupling profile are preferably configured such that two of such panels can be coupled to each other by means of a lowering movement, and wherein each panel comprises at a third panel edge a third coupling profile, and at a fourth panel edge, preferably opposite to the third panel edge, a fourth coupling profile being designed to engage interlockingly with said third coupling profile of an adjacent panel, both in horizontal direction and in vertical direction.

Preferred embodiments of the invention are set out in the non-limitative set of clauses presented below.

Clauses

1. Decorative panel, in particular a floor panel, ceiling panel or wall panel, comprising:

a core provided with an upper side and a lower side, a decorative top structure affixed, directly or indirectly, on said upper side of the core, said decorative top structure comprising:

at least one digitally printed decorative print layer forming at least one décor image, and at least one substantially transparent or translucent cover layer covering said decorative print layer, wherein at least one layer of the decorative top structure comprises a digitally created first texture, and wherein the upper side of the core and/or at least one layer of the decorative top structure comprises a mechanically created second texture.

2. Panel according to clause 1, wherein the first texture is at least partially defined by at least one, at least partially cured base layer provided with a plurality of indentations.

3. Panel according to one of the foregoing clauses, wherein a part of the base layer is provided with said plurality of indentations, and wherein another part of the base layer is free of indentations.

4. Panel according to one of the foregoing clauses, wherein the plurality of indentations of the base layer forms a discontinuous indentation pattern.

5. Panel according to one of the foregoing clauses, wherein the base layer is a printed base layer.

6. Panel according to one of the foregoing clauses, wherein the indentations provided in the base layer have a depth situated in between 2 micron and 100 micron, preferably situated in between 3 micron and 50 micron.

7. Panel according to one of the foregoing clauses, wherein at least a part of the indentations of the base layer is aligned in register with at least a part of at least one decor image formed by the decorative print layer, in particular at least one pattern defined by at least one décor image formed by the decorative print layer.

8. Panel according to one of the foregoing clauses, wherein the indentations provided in the base layer have been formed by material removal from the initial base layer.

9. Panel according to clause 8, wherein the indentations provided in the base layer have been created by digitally printing of reactive droplets onto the base layer, preferably onto the initially liquid base layer.

10. Panel according to clause 8 or 9, wherein the indentations provided in the base layer have been created by digitally printing of an embossing liquid onto an initially liquid base layer and by removal of said embossing liquid after at least partially curing said base layer.

11. Panel according to one of the foregoing clauses, wherein the first texture is at least partially defined by at least one at least partially cured elevated pattern layer formed by a plurality of printed elevations.

12. Panel according to one of clauses 2-10, and clause 11, wherein said elevated pattern layer is printed on top of said base layer.

13. Panel according to clause 12, wherein an upper side of the base layer defines an embossing base level, and wherein the indentations and at least a part of the elevations are situated at opposite sides of said embossing base level.

14. Panel according to clause 12 or 13, wherein an upper side of the base layer defines a base level, and wherein the indentations and at least a part of the elevations are situated at the same side of said base level.

15. Panel according to one of clauses 2-10, and one of clauses 11-14, wherein at least a part of the elevations are printed on the part of the base layer which is free of indentations.

16. Panel according to one of clauses 11-15, wherein the elevations of the elevated pattern layer have a height situated in between 2 micron and 500 micron, preferably situated in between 3 micron and 300 micron.

17. Panel according to one of the foregoing clauses, wherein at least a part of the elevations of the elevated pattern layer is aligned in register with at least a part of at least one decor image formed by the decorative print layer, in particular at least one pattern defined by at least one décor image formed by the decorative print layer.

18. Panel according to one of the foregoing clauses, wherein the impressions are obtained by means of a pressing mould, such as a pressing plate and/or an embossing roll.

19. Panel according to one of the foregoing clauses, wherein at least a part of the impressions of the second texture is aligned in register with at least a part of at least one decor image formed by the decorative print layer, in particular at least one pattern defined by at least one décor image formed by the decorative print layer.

20. Panel according to one of the foregoing clauses, wherein at least one impression has a depth of at least one 0.4 micrometre.

21. Panel according to one of the foregoing clauses, wherein at least one impression has a depth which exceeds the nominal thickness of the decorative top structure.

22. Panel according to one of the foregoing clauses, wherein the maximum depth of the second texture exceeds the maximum depth of the first texture, with respect to a top surface of the panel.

23. Panel according to one of the foregoing clauses, wherein at least one cover layer, preferably at least one wear layer, of the decorative top structure comprises the first texture.

24. Panel according to one of the foregoing clauses, wherein at least one cover layer, preferably at least one wear layer, of the decorative top structure comprises the second texture.

25. Panel according to one of the foregoing clauses, wherein at least one first cover layer, preferably at least one first wear layer, of the decorative top structure comprises the first texture, and wherein at least one second cover layer, preferably at least one second wear layer, of the decorative top structure the second texture.

26. Panel according to one of the foregoing clauses, wherein the decorative top structure comprises at least one wear layer, and at least one top coating, preferably an UV hardened top coating, covering said wear layer 27. Panel according to one of the foregoing clauses, wherein at least a part of the decorative layer is positioned below the first texture and the second texture.

28. Panel according to one of the foregoing clauses, wherein at least a part of the decorative layer is positioned in between the first texture and the second texture.

29. Panel according to one of the foregoing clauses, wherein at least a part of the decorative layer is deformed by the second texture.

30. Panel according to one of the foregoing clauses, wherein at least one first texture is positioned below at least one second texture.

31. Panel according to one of the foregoing clauses, wherein at least one first texture is positioned above at least one second texture.

32. Panel according to one of the foregoing clauses, wherein the panel comprises a top surface, wherein the first texture and the second texture define a relief of said top surface.

33. Panel according to one of the foregoing clauses, wherein a backing layer is affixed to a lower side of the core.

34. Panel according to one of the foregoing clauses, wherein a first panel edge comprises a first coupling profile, and a second panel edge, preferably opposite to the first panel edge, comprising a second coupling profile being designed to engage interlockingly with said first coupling profile of an adjacent panel, both in horizontal direction and in vertical direction, wherein the first coupling profile and the second coupling profile are preferably configured such that two of such panels can be coupled to each other by means of a lowering movement.

35. Panel according to one of the foregoing clauses, wherein the panel comprises at least one third coupling profile and at least one fourth coupling profile located respectively at a third panel edge and a fourth panel edge, wherein the third coupling profile comprises:
   a sideward tongue extending in a direction substantially parallel to the upper side of the core,
   at least one second downward flank lying at a distance from the sideward tongue, and
   a second downward groove formed between the sideward tongue and the second downward flank,
wherein the fourth coupling profile comprises:
   a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

36. Panel according to one of the foregoing clauses, wherein the core is substantially rigid.

37. Panel according to one of the foregoing clauses, wherein the core is at least partially foamed.

38. Panel according to one of the foregoing clauses, wherein the core comprises at least one polymer selected from the group consisting of: ethylene vinyl acetate (EVA), polyurethane (PU), polyethylene (PE), polypropylene (PP), polystyrene (PS), polyvinylchloride (PVC), polyethylene terephthalate (PET), Polyisocyanurate (PIR), or mixtures thereof.

39. Panel according to one of the foregoing clauses, wherein the core comprises at least one wood-based material.

40. Panel according to one of the foregoing clauses, wherein the core comprises at least one composite material of at least one polymeric material and at least one non-polymeric material.

41. Panel according to clause 40, wherein at least one non-polymeric material is selected from the group consisting of: talc, chalk, wood, calcium carbonate, and a mineral filler.

42. Panel according to one of the foregoing clauses, wherein the decorative top structure comprises a plurality of substantially transparent or translucent cover layers covering said decorative print layer, comprising at least one digitally printed base cover layer, and at least one digitally printed textured cover layer, covering said base cover layer, wherein said textured cover layer comprises at least one digitally created first texture, wherein the upper side of the core and/or at least one layer of the decorative top structure comprises at least one mechanically created second texture, wherein, preferably, at least one second texture is located at at least one panel edge and preferably forms at least one bevel and/or at least one grout.

43. Panel according to one of the foregoing clauses, wherein at least one second texture is an impressed second texture, wherein said impressed second texture is preferably located at at least one panel edge.

44. Panel according to one of the foregoing clauses, wherein at least one second texture defines a thinned section of the textured cover layer, which is preferably realized by material removal of said cover layer.

45. Panel according to one of the foregoing clauses, wherein the at one grout is formed by at least one exposed portion extending along a length of at least one edge, wherein said at least one exposed portion extends outwardly below and away from a top surface of the panel, and is at least partially defined by the decorative top structure, preferably partially defined by a sidewall of the textured cover layer.

46. Panel according to one of the foregoing clauses, wherein at least one grout and/or at least one bevel comprises a textured upper surface.

47. Panel according to one of the foregoing clauses, wherein a portion of the core and/or a portion of the decorative top structure at and/or underneath at least one second texture has a higher density than an adjacent portion of the core and/or an adjacent portion of the decorative top structure, respectively.

48. Panel according to one of the foregoing clauses, wherein the base cover layer is a matte cover layer.

49. Panel according to one of the foregoing clauses, wherein the textured cover layer is a glossy cover layer.

50. Panel according to one of the foregoing clauses, wherein the base cover layer has a lower gloss level than the textured cover layer.

51. Panel according to one of the foregoing clauses, wherein the at least one bevel and/or at least one grout is coated, preferably by an opaque coating layer and/or by a coloured coating layer.

52. Panel according to one of the foregoing clauses, wherein the base cover layer is free of any first texture.

53. Panel according to one of the foregoing clauses, wherein at least one primer layer is situated in between the core layer and the decorative top structure.

54. Panel according to one of the foregoing clauses, wherein at least one primer layer is situated in between the decorative print layer and the base cover layer.

55. Panel according to one of the foregoing clauses, wherein the decorative top structure is an unfoamed top structure.

56. Panel according to one of the foregoing clauses, wherein the decorative print layer is a flat layer, being free of any first texture and second texture.

57. Panel according to one of the foregoing clauses, wherein the at least one first texture is a digitally printed, negatively patterned first texture, preferably realized by printing a plurality of droplets on a still untextured textured cover layer, such that the thickness of the textured cover layer is changed on the positions where the droplets are printed onto to form indentations in the textured cover layer.

58. Panel according to one of the foregoing clauses, wherein at least one second texture is applied underneath the decorative top structure.

59. Panel according to one of the foregoing clauses, wherein at least one first texture and at least one second texture overlap as seen from a top view of the panel.

60. Panel according to one of the foregoing clauses, wherein a rear side of the panel, preferably a rear side of the core layer, is provided with an impressed pattern of cavities.

61. Panel according to one of the foregoing clauses, wherein a rear side of the core is attached to at least one backing layer.

62. Panel according to one of the foregoing clauses, wherein the core comprises magnesium oxide and/or magnesium hydroxide.

63. Decorative panel covering, in particular floor covering, ceiling covering, or wall covering, comprising a plurality of decorative panels, preferably mutually coupled decorative panels, according to any of the of the foregoing clauses.

64. Panel covering according to clause 63, wherein the panel covering further comprises a plurality of other decorative panels, comprising:
  a core provided with an upper side and a lower side,
  a decorative top structure affixed, directly or indirectly, on said upper side of the core, said decorative top structure comprising:
  at least one digitally printed decorative print layer forming at least one décor image, and
  at least one substantially transparent or translucent cover layer covering said decorative print layer,
wherein at least one layer of the decorative top structure comprises a digitally created first texture, or wherein the upper side of the core and/or at least one layer of the decorative top structure comprises a mechanically created second texture.

65. Panel covering according to clause 63 or 64, wherein each panel comprises at a first panel edge a first coupling profile, and at a second panel edge, preferably opposite to the first panel edge, a second coupling profile being designed to engage interlockingly with said first coupling profile of an adjacent panel, both in horizontal direction and in vertical direction, wherein the first coupling profile and the second coupling profile are preferably configured such that two of such panels can be coupled to each other by means of a lowering movement, and wherein each panel comprises at a third panel edge a third coupling profile, and at a fourth panel edge, preferably opposite to the third panel edge, a fourth coupling profile being designed to engage interlockingly with said third coupling profile of an adjacent panel, both in horizontal direction and in vertical direction.

BRIEF DESCRIPTION OF THE DRAWINGS

The terms Fig., Figs., Figure, and Figures are used interchangeably in the specification to refer to the corresponding figures in the drawings.

The present invention will hereinafter be further elucidated on the basis of the following non-limitative exemplary drawings wherein.

DESCRIPTION OF THE INVENTION

Figures 1A, 1B, 1C, 1D, 1E:
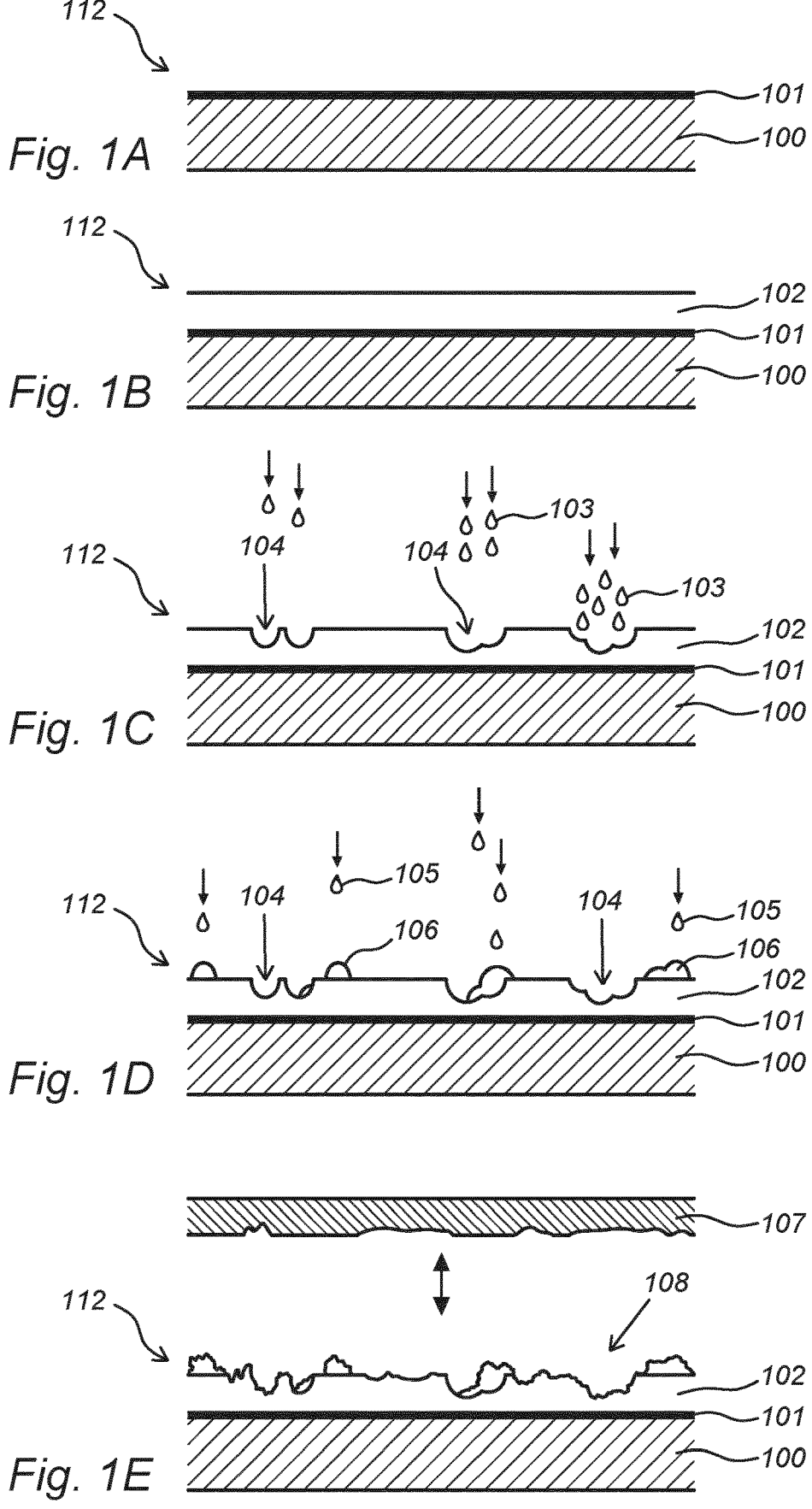
FIGS. 1A-1E schematically show subsequent steps of creating the decorative panel according to a first embodiment the invention.

In FIG. 1A-1E schematically show the steps for obtaining a decorative panel 112 according to a first non-limitative embodiment of the invention. FIG. 1A shows a schematic representation of a cross section of a decorative panel 112. This figure in particular indicates the core layer 100 of said panel 112, preferably the core is substantially rigid. A decorative print layer 101 is provided on an upper surface of the core layer 100. The decorative print layer 101 is preferably digitally printed on the upper side of the core layer 100. It is noted that the decorative print layer 101 may also be applied on a primer layer (not shown) and/or a white base coat (not shown), said primer layer placed on the upper side of the core layer 100 on which the decorative print layer 101 is printed digitally, and said white base coat applied on top of said primer and/or directly on top of said core layer 100. In order for the decorative print layer 101 to remain visible, it is preferably only covered by (semi-) transparent and/or translucent layers subsequent layers. FIG. 1B shows a liquid base layer 102 provided on top of the decorative print layer 101. It is preferred that said base layer 102 is a printed base layer, printed either directly or indirectly on top of the decorative print layer 101. FIG. 1C shows the application of embossing droplets 103. Said embossing droplets 103 are preferably applied on the base layer 102 before the base layer 102 is fully cured, and the bae layer 102 is therefore at least partially in liquid state during application of the embossing droplets 103. However, it is conceivable that more indentations 104 may be applied by embossing droplets 103 after curing the base layer 102. All indentations 104 together form an indentation pattern. The embossing droplets 103 are position-selectively digitally printed onto the liquid base layer 102 such that a chemical reaction is caused between the embossing droplets 103 and the base layer 102. Moreover, the droplets 103 are preferably positioned in accordance with the decorative print layer 101, such as to enhance the three-dimensional effect of the decorative print layer 101. Subsequently, as shown in FIG. 1D, a plurality of embossing droplets 105 may be provided on the, preferably still not fully cured, base layer 102. The embossing droplets 105 in this step may be of an alternative embossing liquid, such that elevations 106 are formed by the embossing droplets 105. All elevations 106 together form an elevation pattern. The indentation and elevation patterns applied by means of the embossing droplets 103, 105 on the base layer 102 together form a first texture. It is preferred that both embossing droplets 103, 105 are applied in correspondence with the decorative print layer 101. As such, at least a part of the elevations 106 of the elevation pattern and at least a part of the indentations 104 of the indentation pattern are aligned in register with at least a part of at least one décor image of the decorative print layer 101. To this end it is possible that some indentations 104 and elevations 105 overlap such that a panel 112 with an irregular height structure is obtained. Subsequent to applying indentations 104 and elevations 106 to the panel 112, a pressing mould 107 could be used to even further enhance the level of detail of the decorative top structure. The pressing mould 107 is depicted in FIG. 1E as a pressing plate 107, however may also be embodied as an embossing roll. The pressing mould 107 is pressed onto the upper surface of the panel 112 that is obtained through FIGS. 1A-1D. After lifting the pressing mould 107 from the panel 112 a second texture 108 is revealed, in addition to the first texture. Moreover, it is preferred that also the second texture 108, which is a result of the impression of the pressing mould 107, is in correspondence with the décor image of the decorative print layer 101. By utilizing multiple structure forming techniques, a more detailed texture can be obtained, to form deeper indentations and create a more realistic appearance of the panel 112 as such. Before using the pressing plate 107 to form the second texture layer, preferably the first texture layer is not fully cured. That is, the first texture layer should be in a somewhat deformable state during mechanical pressing. However, it is also possible to fully cure the first texture layer, hence the indentation and elevation patterns, prior to mechanical pressing. If the first texture layer is fully cured prior to mechanical pressing using a pressing mould 107, an additional intermediate base layer (not shown) is applied which remains in a deformable state during mechanical pressing. This may result in a panel 112 having substantially the same appearance, albeit possibly somewhat thicker since an intermediate base layer is applied.

Figures 2A, 2B, 2C, 2D, 2E, 2F:
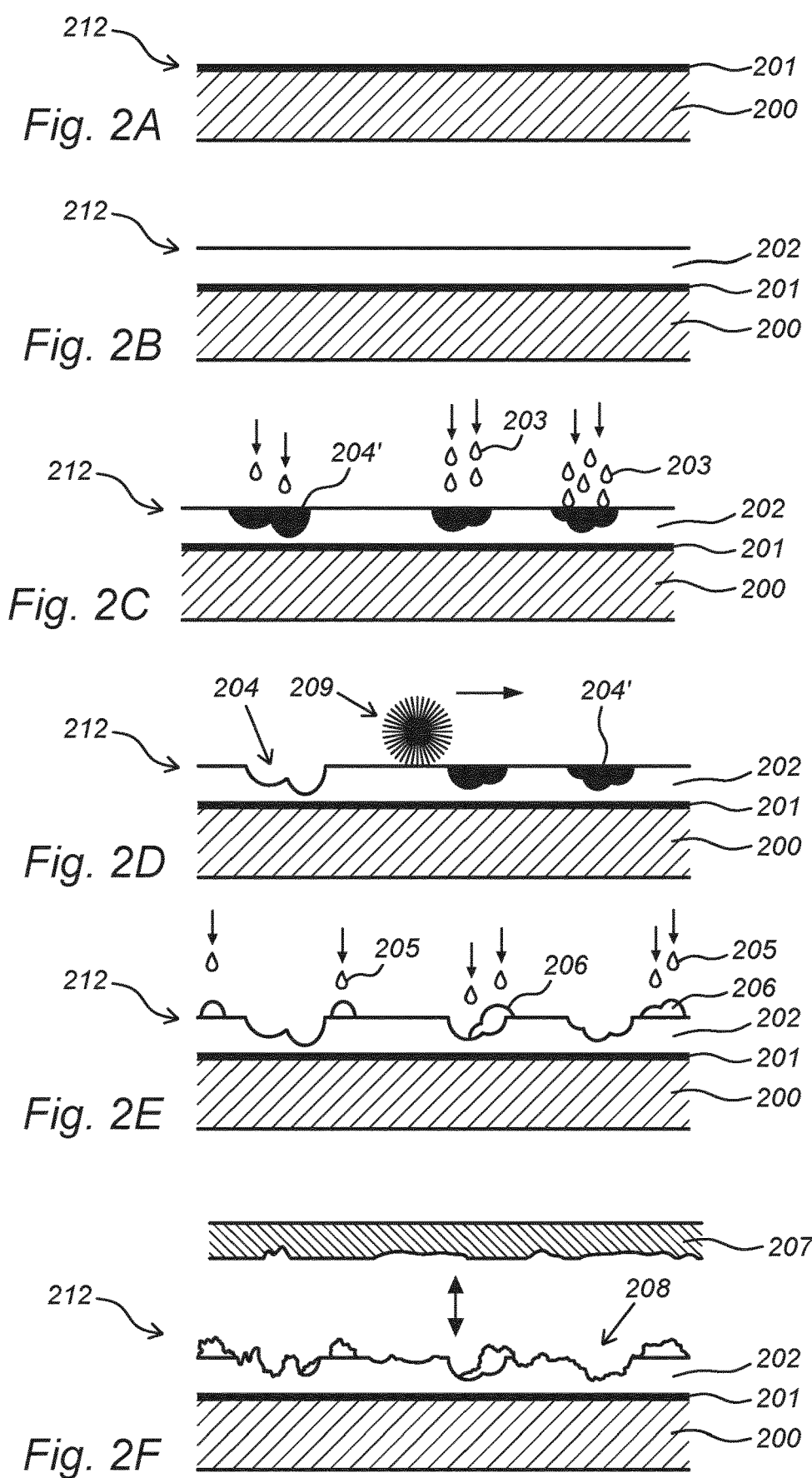
FIGS. 2A-2F schematically show subsequent steps of creating the decorative panel according to a second embodiment of the invention.

FIGS. 2A-2F depict a comparable panel 212 as seen in FIGS. 1A-1E, wherein the steps depicted in FIGS. 1C-1D (forming the first texture layer) are replaced by a different approach for forming the first texture layer, as show in FIGS. 2C-2E. FIGS. 2A and 2B respectively show a cross section of the panel 212 formed by a core 200 and a decorative print layer 201 provided on an upper surface of the core 200, and a base layer 202 provided onto the decorative print layer 201. It is noted that between the upper surface of the core layer 200 and the decorative print layer 201 a primer and/or a preferably white base coat (not shown) could be applied. During the steps indicated in FIGS. 2C-2E, the first texture layer is applied. FIG. 2C thereto shows the application of an embossing liquid 203 on the base layer 202 in the form of droplets 203. Preferably, the droplets 203 are applied position-selectively on the base layer 202 in correspondence with the décor image of the decorative print layer 201. FIG. 2C shows the accumulation of embossing liquid 203 in the base layer 202 in the form of predetermined indentations 204'. Unlike depicted in FIG. 1C, the droplets do not cause the base layer 202 to be removed locally. In order to reveal the final indentations 204, the base layer 202 is at least partially cured in order to harden said base layer 202. During the (partial) curing process the embossing liquid 203 causes the base layer 202, in particular on the predetermined indentations 204', to remain in its liquid state, allowing the base layer 202 in these regions 204' to be subsequently removed by a brush 209. Alternative to the brush 209 depicted in FIG. 2D it is also conceivable that alternative manners are utilized to remove the uncured base layer 202. It is the specific composition of the embossing liquid 203 that allows the predetermined regions 204' where droplets 203 of said embossing liquid 203 are applied to remain in liquid state even after curing of the base layer 202. After all the uncured base layer material 204' is removed, the final indentations 204 remain in the base layer 202. All the indentations 204 again form an indentation pattern. Subsequently, elevations 206 could be similarly applied as shown in FIG. 1D. All elevations 206 together form the elevation pattern. After application of the first texture layer as indicated by FIGS. 2A-2E, a second texture layer, in particular a mechanical texture layer, could be applied. If the first t first texture layer is applied in accordance to the FIGS. 2A-2E, it might be beneficial, due to the partial hardening of the base layer 202 in order to remove the material at the predetermined locations 204', to apply an intermediate base layer (not shown) before applying the mechanical pressing means 207 to form the second texture layer 208. The second, mechanical, texture layer is applied in similar fashion as compared to FIG. 1E.

Figures 3A, 3B, 3C, 3D:
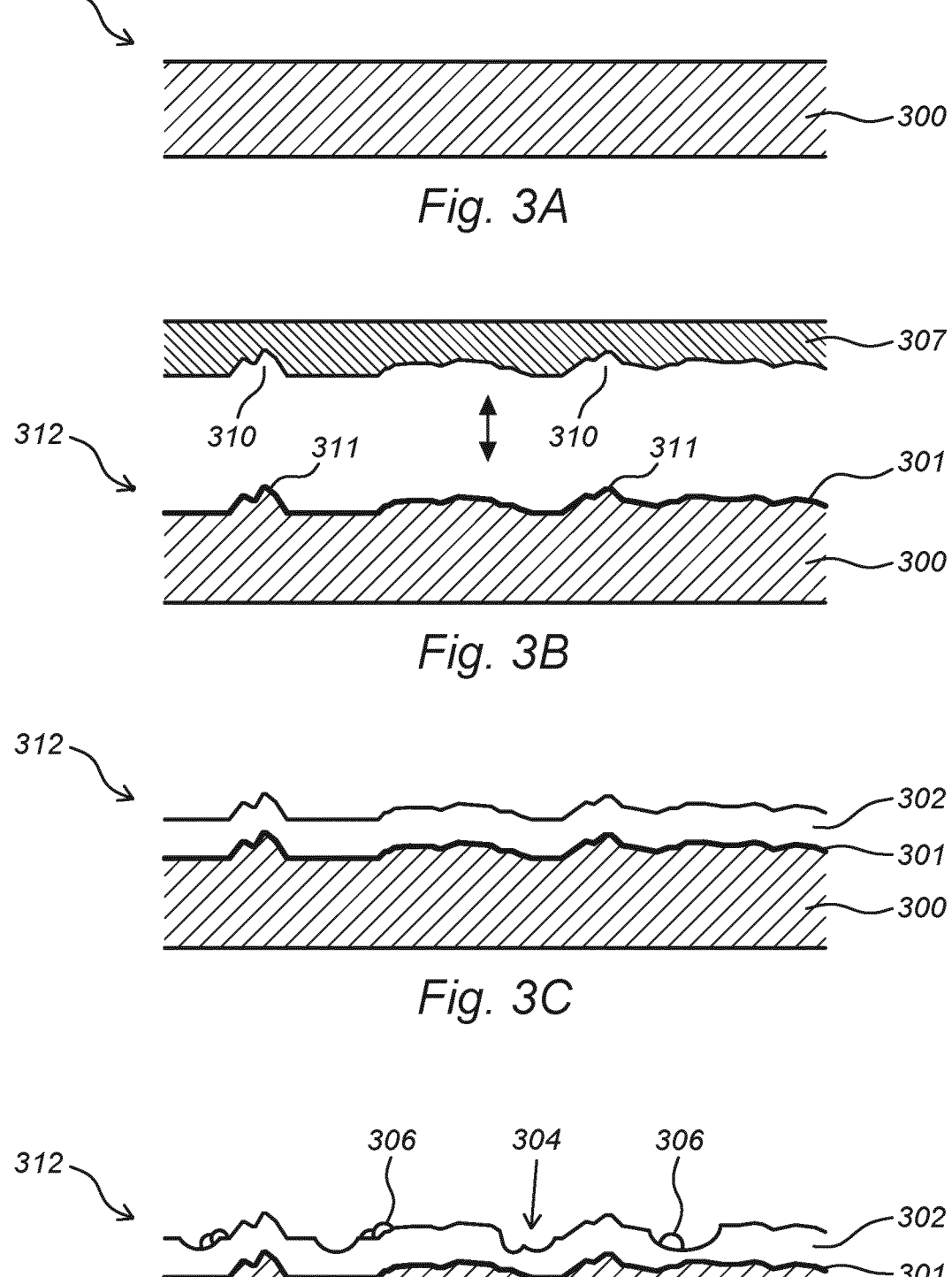
FIGS. 3A-3D schematically represent the subsequent steps of creating the decorative panel according to a third embedment.

FIG. 3 depicts yet another embodiment of the panel 312 according to the invention. To this end a cross sectional schematic view of the core layer 300 is shown in FIG. 3A. Although it is not shown in FIG. 3A, a base and/or primer layer may be applied on the upper surface of the core layer 300. FIG. 3B shows a mechanical pressing plate 307 used to provide a texture layer. The pressing plate 307 provides a texture to the upper surface of the core layer 300 and/or the base layer if applied in the previous step (not shown). The mechanical press 307 could as well be formed by a roller, and is provided with a plurality of impressions 310. After pressing the pressing plate 307 onto the upper surface of the core layer 300, the reflections 311 on the core layer 300 represent the impressions 310 of the pressing structure 307 being left on the core layer. A decorative print layer 301 is applied on the upper surface of the core 300, preferably after pressing said core 300. However, it is also possible to apply the decorative print layer 301 prior to pressing the core layer, to this end due care should be taken to prevent local stretching of the decorative print layer 301, which could negatively affect the décor image. Applying a texture to the core layer 300 could enhance the three-dimensional appearance of the décor image, since the image of the decorative print layer 301 itself has a relief that could correspond with the image. After application of the texture layer in FIG. 3B, a liquid base layer 302 is applied on top of the decorative print layer 301. FIG. 3C shows that the base layer 302 follows the texture layer that is impressed in the core 300. After application of the base layer 302 an additional texture layer could be applied, by using the techniques shown in FIGS. 1A-1D, or 2A-2E, e.g. by means of chemical embossing using droplets. To this end FIG. 3D shows the end result of a panel 312 to which such a technique has been applied subsequent to applying a texture to the core layer 300. A plurality of indentations 304 are provided in the base layer 302, forming an indentation pattern, as well as a plurality of elevations 306, forming an elevation pattern. Preferably the mechanical impressions shown in FIG. 3B are in accordance with the décor image of the decorative print layer 301. To further enhance the appearance of the panel 312, e.g. to accentuate certain features such as knots in a wooden panel, the indentations 304 and/or the elevations 306 are applied in correspondence with the décor image of the decorative print layer 301 as well.

Figure 4A:
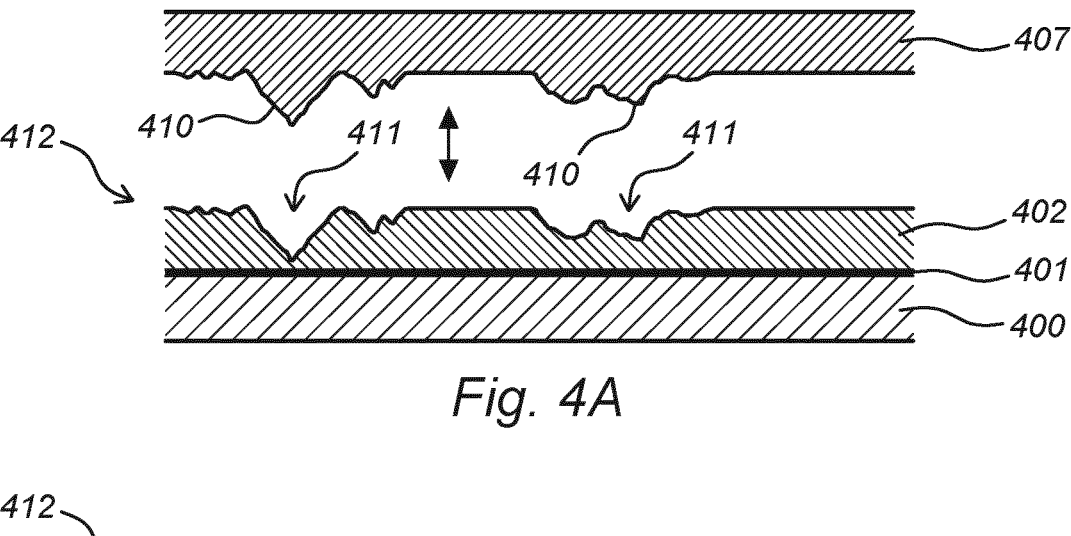
FIGS. 4A-4C schematically represent the subsequent steps of creating the decorative panel according to a fourth embodiment.
Figure 4B:
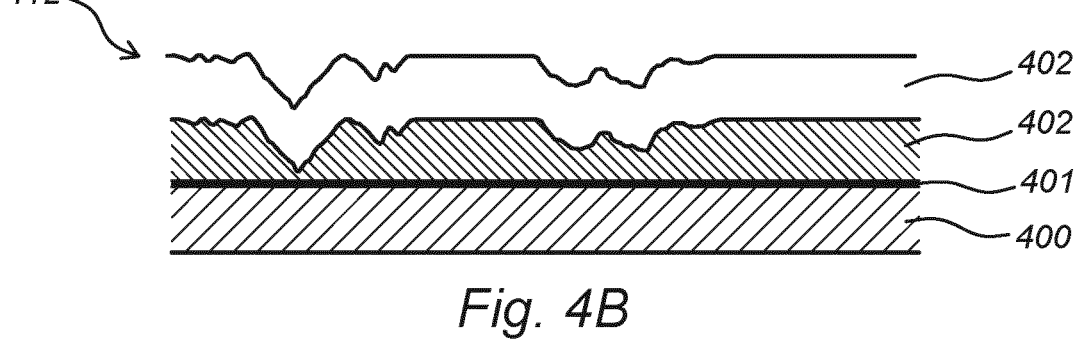
Figure 4C:
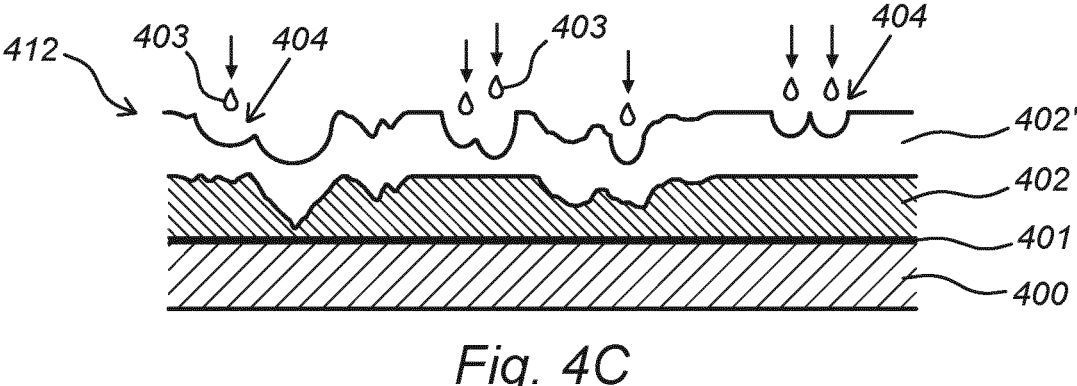

FIGS. 4A-4C depict another embodiment of the panel 412 according to the invention. A cross sectional view of the base layer 400, onto which a decorative print layer 401 is applied is shown in FIG. 4A. The decorative print layer 401 could be applied directly onto the upper surface of the core 400 or alternatively by means of a primer. On top of the decorative print layer 401 a liquid base layer 402 is applied. The liquid base layer 402 is deformed by means of a mechanical pressing means 407, formed by a pressing plate 407 in this figure. To this end it is preferred that the base layer 402 is not fully cured during pressing. It is noted that the pressing plate 407 could be embodied by a roller or other means as well. The protrusions 410 on the pressing plate 407 are impressed into the base layer 402, and leave impressions 411 on those locations. The impressions 411 left by the pressing plate 407 represent a texture layer formed in the base layer 402. FIG. 4B indicates the application of an additional base layer 402', which is applied onto the base layer 402. The additional base layer 402' follows the surface texture of the impressed base layer 402, such that the texture layer is maintained. After application of the additional base layer 402', an additional texture layer may be provided by means of chemical embossing in the additional base layer 402'. Although FIG. 4C only shows negative embossing, by means of embossing droplets 403 which react with the material of the intermediate base layer 402' leaving behind indentations 404, it is also possible to provide a positive embossing texture afterward, such as depicted in FIG. 1D or 2E. Optionally, although not shown in any of the figures, one or more finishing layers can be applied to the panel 112, 212, 312, 412, in particular over the uppermost texture layer. It is furthermore noted that although only two base layers 402 and 402' are shown in this figure, the process could be repeated endlessly. This allows to create relatively deep indentations and/or impressions in the panel, such that certain features of the décor image of the decorative print layer 401 could be represented realistically. The same applies to FIGS. 1A-1E, 2A-2F, and 3A-3D, wherein it is also conceivable to repeat the depicted process in an arbitrary order, or combine processes, in order to end up with a panel 112, 212, 312, 412 with a realistic texture and appearance.

Figure 5:
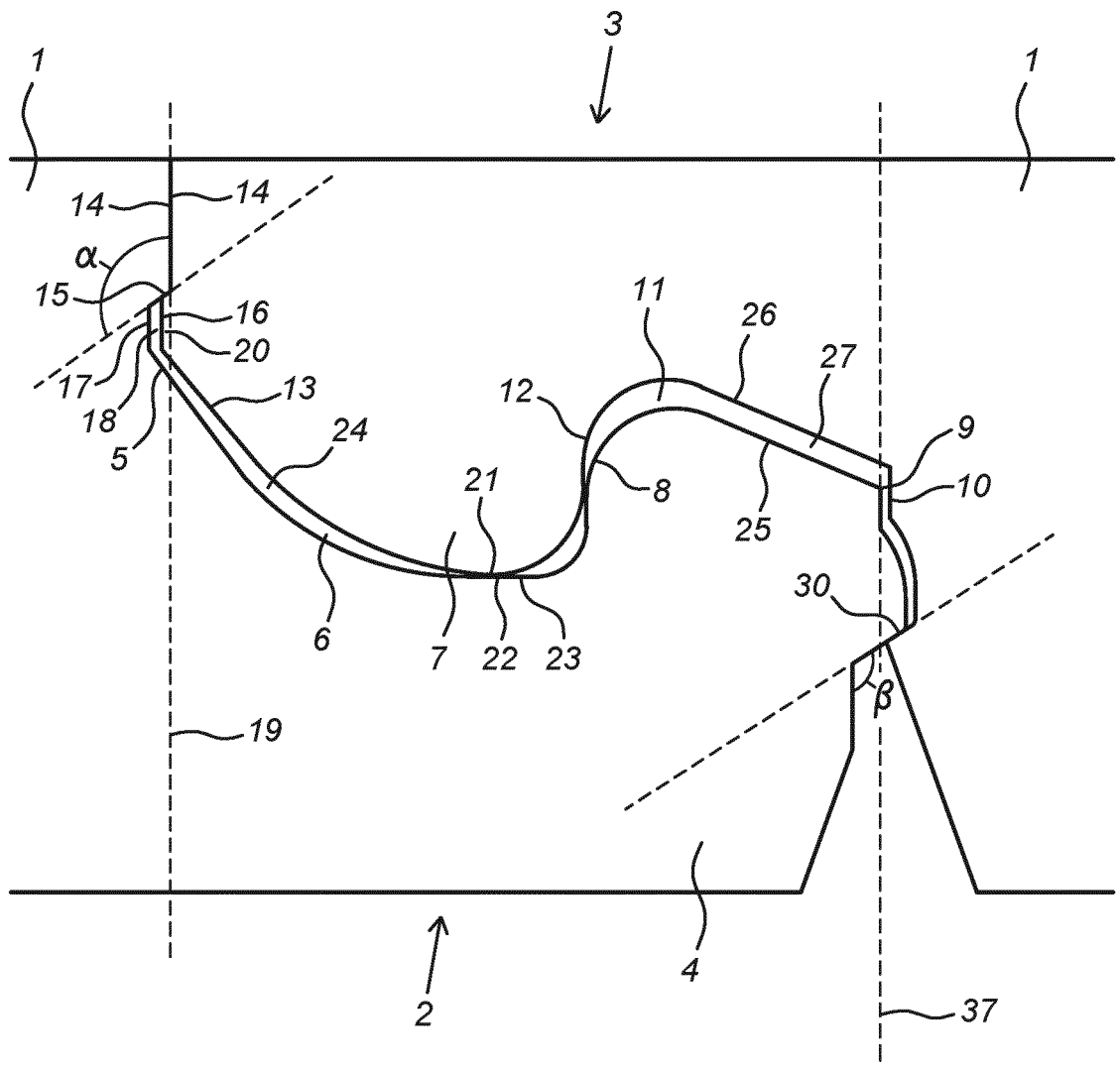
FIG. 5 schematically shows two interconnected panels with first and second coupling parts according to the present invention.

FIG. 5 shows a floor panel 112 according to the invention, comprising a first coupling part 2 and a second coupling part 3 in coupled condition. The first coupling part 2 comprises an upward tongue 4, an upward flank 5 lying at a distance from the upward tongue 4 and an upward groove 6 formed in between the upward tongue 4 and the upward flank 5, wherein the upward groove 6 adapted the downward tongue 7 of a second coupling part 3 of another panel 112. The side of the upward tongue 4 facing towards the upward flank is the inside 8 of the upward tongue 4 and the side of the upward tongue 4 facing away from the upward flank 5 is the outside 9 of the upward tongue 4.

The second coupling part 3 comprises a downward tongue 7, a downward flank 10 lying at a distance from the downward tongue 7, and a downward groove 11 formed in between the downward tongue 7 and the downward flank 10. The side of the downward tongue 7 facing towards the downward flank 10 is the inside 12 of the downward tongue

7 and the side of the downward tongue 7 facing away from the downward flank 10 is the outside 13 of the downward tongue 7.

The outside 13 of the downward tongue 7 and the upward flank 5 both comprise an upper contact surface 14 at the top of the panel 112, which upper contact surfaces 14 are in contact extend vertically. Adjoining the upper contact surfaces 14 both the downward tongue 7 and the upward flank 5 comprise an inclined contact surface 15, which inclined contact surfaces 15 are in contact, wherein the upper contact surfaces 14 on the one hand, and the inclined contact surfaces 15 of the upward flank 5 and/or the outside 13 of the downward tongue 7 on the other hand preferably mutually enclose an angle α of approximately 125 degrees. The upper contact surface 14 and the inclined contact surface of the upward flank 5 mutually enclose a first angle of about 125 degrees, and the upper contact surface 14 and the inclined contact surface 15 of the downward tongue 7 mutually enclose a second angle of about 125 degrees.

Adjoining the inclined contact surface 15 the downward tongue 7 comprises an outer surface 16, and adjoining the inclined contact surface 15 the upward flank 5 comprises an inner surface 17, wherein the outer 16 and inner 17 surface are parallel and vertical. Between the outer surface 16 and the inner surface 17 a space 18 is present.

The upper contact surfaces 14 define an inner vertical plane 19, wherein the inclined contact surface 15 of the downward tongue 7 extends beyond the inner vertical plane 19 the inclined contact surface 15 of the upward flank 5 lies inward compared to the inner vertical plane 19. A portion 20 of the downward tongue 7 extends beyond the inner vertical plane 19, wherein said portion 20 is substantially trapezium-shaped or wedge-shaped. The inclined contact surfaces 15 are both arranged completely outside and adjoining the inner vertical plane 19. The portion 20 is elongated with a larger vertical portion compared to the horizontal portion.

The bottom 21 of the downward tongue 7 contacts the upper side 22 of the upward groove 6 at a groove contact surface 23, wherein a gap 24 is present between the first 2 and second 3 coupling parts, extending from the inclined contact surfaces 15 to the groove contact surface 23. Additionally the upper surface 25 of the upward tongue 4 and the upper surface 26 of the downward groove 11, are distanced from each other such that a gap 27 is present between the two surfaces 25, 26.

The outside 9 of the upward tongue 4 comprises a first locking element 28, in the form of an outward bulge and the downward flank 10 is provided with a second locking element 29, in the form of a recess, wherein the first 28 and at least a part of second 29 locking element are in contact, and form a locking element surface 30.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application. The subject-matter of this document, for example, also includes all of the above embodiments of the panel according to the invention, wherein the second texture is omitted, and wherein merely at least one first texture is applied. The subject-matter of this document, for example, also includes all of the above embodiments of the panel according to the invention, wherein the second texture is created in an alternative and/or additional manner, for example, by irradiation (e.g. by using a laser) and/or pneumatically (by using one or more gas nozzles) and/or hydraulically (by using one or more liquid jets, such as water jets). Preferably, these one or more irradiation sources and/or jets are digitally controllable to allow the formation of a digitally predefined second texture.

The ordinal numbers used in this document, like "first", "second", "third", and "fourth" are used only for identification purposes. Hence, the use e.g. of the expressions "third locking element" and "second locking element" does therefore not necessarily require the co-presence of a "first locking element". The decorative panels according to the invention may also be referred to as decorative tiles. By "complementary" coupling profiles is meant that these coupling profiles can cooperate with each other. However, to this end, the complementary coupling profiles do not necessarily have to have complementary forms. By locking in "vertical direction" is meant locking in a direction perpendicular to the plane of the panel. By locking in "horizontal direction" is meant locking in a direction perpendicular to the respective coupled edges of two panels and parallel to or falling together with the plane defined by the panels.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A decorative panel, comprising:
a core provided with an upper side and a lower side,
a decorative top structure affixed, directly or indirectly, on said upper side of the core, said decorative top structure comprising:
at least one digitally printed decorative print layer forming at least one décor image, and
a plurality of substantially transparent or translucent cover layers covering said decorative print layer, said cover layers comprising at least one base cover layer, and at least one, at least partially digitally printed, textured cover layer, covering said base cover layer,
wherein said textured cover layer comprises at least one digitally created first texture, wherein the upper side of the core comprises at least one mechanically created second texture, wherein the at least one second texture is located at at least one panel edge and forms at least one bevel and/or at least one grout, and wherein at least a part of the decorative print layer is deformed by the second texture.

2. The panel according to claim 1, wherein the first texture is at least partially defined by the at least one base cover layer, wherein the at least one base cover layer is at least partially cured and provided with a plurality of indentations.

3. The panel according to claim 1, wherein the at least one base cover layer is a printed base cover layer.

4. The panel according to claim 2, wherein the indentations provided in the base cover layer have a depth situated in between 2 micron and 100 micron.

5. The panel according to claim 2, wherein at least a part of the indentations of the base cover layer is aligned in register with at least a part of the at least one decor image formed by the decorative print layer.

6. The panel according to claim 2, wherein the indentations provided in the base cover layer are formed by material removal from the base cover layer, or wherein the indentations provided in the base cover layer are created by digitally printing of reactive droplets onto the base cover layer.

7. The panel according to claim 1, wherein the upper side of the core comprises one or more impressions to provide the second texture.

8. The panel according to claim 7, wherein at least a part of the one or more impressions is aligned in register with at least a part of the at least one decor image formed by the decorative print layer.

9. The panel according to claim 1, wherein a maximum depth of the second texture exceeds a maximum depth of the first texture, with respect to a top surface of the panel.

10. The panel according to claim 1, wherein at least one wear layer of the decorative top structure comprises the second texture.

11. The panel according to claim 1, wherein at least one first wear layer of the decorative top structure comprises the first texture, and wherein at least one second wear layer of the decorative top structure comprises the second texture.

12. The panel according to claim 1, wherein a first panel edge comprises a first coupling profile, and a second panel edge, opposite to the first panel edge, comprises a second coupling profile being designed to engage interlockingly with said first coupling profile of an adjacent panel, both in horizontal direction and in vertical direction.

13. The panel according to claim 1, wherein the at least one second texture defines a thinned section of the textured cover layer, which is realized by material removal of said textured cover layer.

14. The panel according to claim 1, wherein the at least one grout is formed by at least one exposed portion extending along a length of the at least one panel edge, wherein said at least one exposed portion extends outwardly below and away from a top surface of the panel, and is at least partially defined by the decorative top structure.

15. The panel according to claim 1, wherein the at least one grout and/or the at least one bevel comprises a textured upper surface.

16. The panel according to claim 1, wherein the base cover layer has a lower gloss level than the textured cover layer.

17. The panel according to claim 1, wherein the at least one bevel and/or the at least one grout is coated by an opaque coating layer and/or by a coloured coating layer.

18. The panel according to claim 1, wherein the base cover layer is free of any of the first texture and/or wherein the decorative print layer is a flat layer that is free of any of the first texture and the second texture.

19. The panel according to claim 1, wherein the at least one second texture is applied underneath the decorative top structure.

20. The panel according to claim 1, wherein the at least one first texture and the at least one second texture overlap as seen from a top view of the panel.

21. A decorative panel covering comprising a plurality of the decorative panels according to claim 1.

* * * * *